(12) United States Patent
Lin et al.

(10) Patent No.: US 11,372,191 B2
(45) Date of Patent: *Jun. 28, 2022

(54) IMAGING LENS ASSEMBLY, CAMERA MODULE AND ELECTRONIC DEVICE

(71) Applicant: LARGAN PRECISION CO., LTD., Taichung (TW)

(72) Inventors: Cheng-Feng Lin, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 211 days.

This patent is subject to a terminal disclaimer.

(21) Appl. No.: 16/736,018

(22) Filed: Jan. 7, 2020

(65) Prior Publication Data

US 2020/0142149 A1 May 7, 2020

Related U.S. Application Data

(63) Continuation of application No. 16/558,202, filed on Sep. 2, 2019, now Pat. No. 10,564,382, which is a (Continued)

(30) Foreign Application Priority Data

Aug. 11, 2017 (TW) .................................. 106127359

(51) Int. Cl.
*G02B 7/02* (2021.01)
*G02B 1/14* (2015.01)
*G02B 13/00* (2006.01)
*G02B 1/10* (2015.01)
*G02B 1/04* (2006.01)

(52) U.S. Cl.
CPC ............. *G02B 7/021* (2013.01); *G02B 1/041* (2013.01); *G02B 1/10* (2013.01); *G02B 1/14* (2015.01); *G02B 13/0045* (2013.01)

(58) Field of Classification Search
CPC . G02B 1/14; G02B 1/041; G02B 1/10; G02B 7/021; G02B 13/0045
See application file for complete search history.

(56) References Cited

U.S. PATENT DOCUMENTS 7,304,813 B2 12/2007 Sakaki
7,391,457 B2 6/2008 Fujimoto et al.
(Continued)

*Primary Examiner* — Jack Dinh
(74) *Attorney, Agent, or Firm* — McClure, Qualey & Rodack, LLP

(57) ABSTRACT

An imaging lens assembly includes a plastic barrel and a lens set, and the lens set is disposed in the plastic barrel. The plastic barrel includes an object-side outer surface, a first inner surface and a second inner surface. The lens set has an optical axis, and includes, in order from an object side to an image side thereof, at least one plastic lens element and a spacer. A light-absorbing coating is disposed on the plastic lens element. The spacer includes an object-side connecting surface and a relative surface. When the object-side connecting surface is connected with a neighboring object-side optical element, the relative surface is out of touch with the neighboring object-side optical element. There is an overlap between the second inner surface and the relative surface along a direction parallel to the optical axis.

21 Claims, 27 Drawing Sheets

Related U.S. Application Data continuation of application No. 15/869,359, filed on Jan. 12, 2018, now Pat. No. 10,444,464.

(56) References Cited

U.S. PATENT DOCUMENTS

| | | |
|---|---|---|
| 7,446,961 B2 | 11/2008 | Sakamoto |
| 7,755,857 B2 | 7/2010 | Yu |
| 8,031,412 B2 | 10/2011 | Shintani |
| 8,102,609 B2 | 1/2012 | Tsuchiya |
| 8,736,989 B2 | 5/2014 | Wu |
| 8,780,461 B2 | 7/2014 | Watanabe |
| 8,958,155 B2 | 2/2015 | Kubota |
| 9,140,826 B2 | 9/2015 | Miyazaki et al. |
| 9,341,813 B1 | 5/2016 | Lin et al. |
| 9,513,454 B2 | 12/2016 | Lin et al. |
| 10,564,382 B2 * | 2/2020 | Lin .................. G02B 1/041 |
| 2011/0200810 A1 | 8/2011 | Kubota |
| 2015/0125689 A1 | 5/2015 | Kubota |
| 2016/0363701 A9 | 12/2016 | Kubota |

* cited by examiner

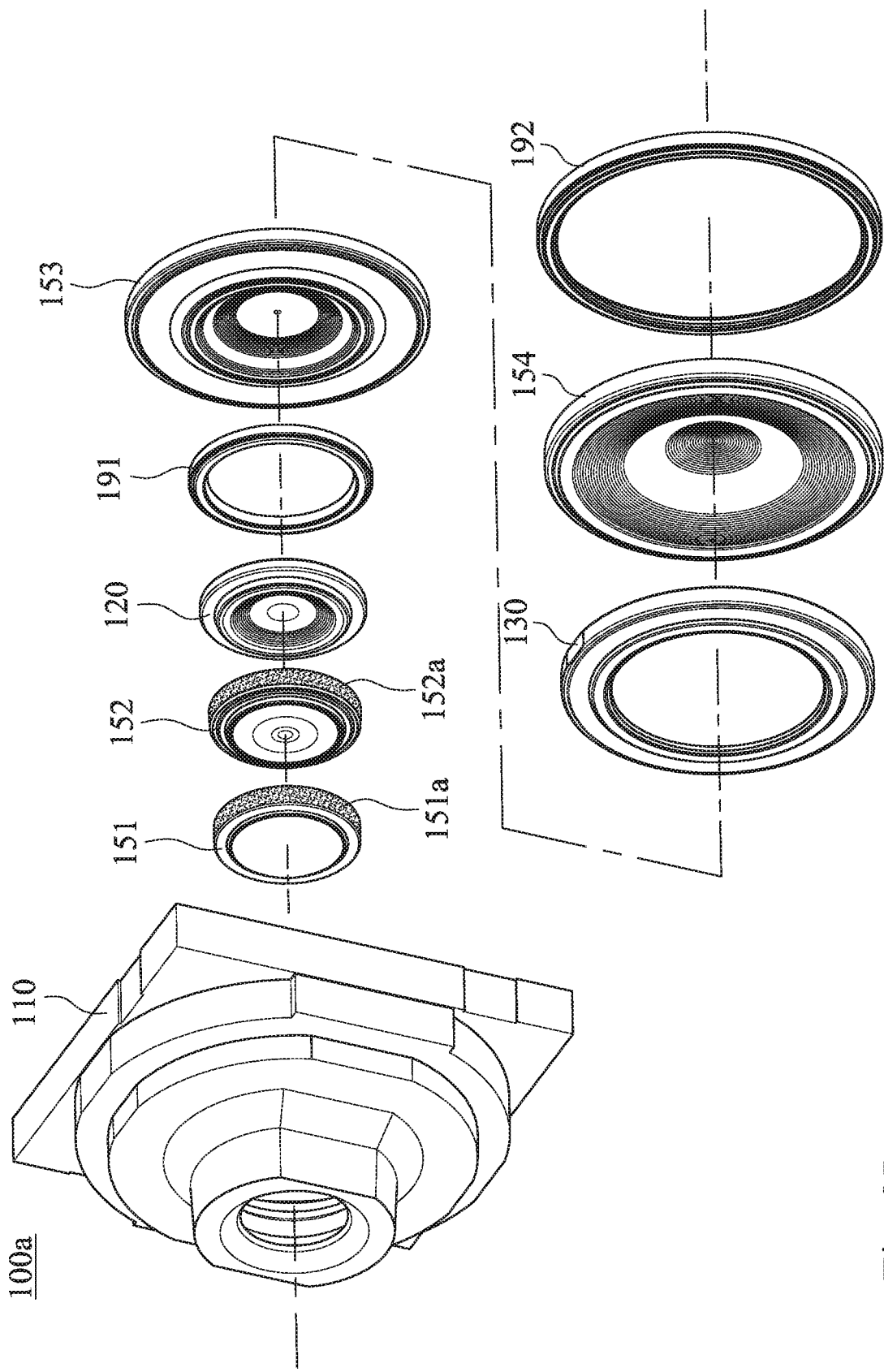

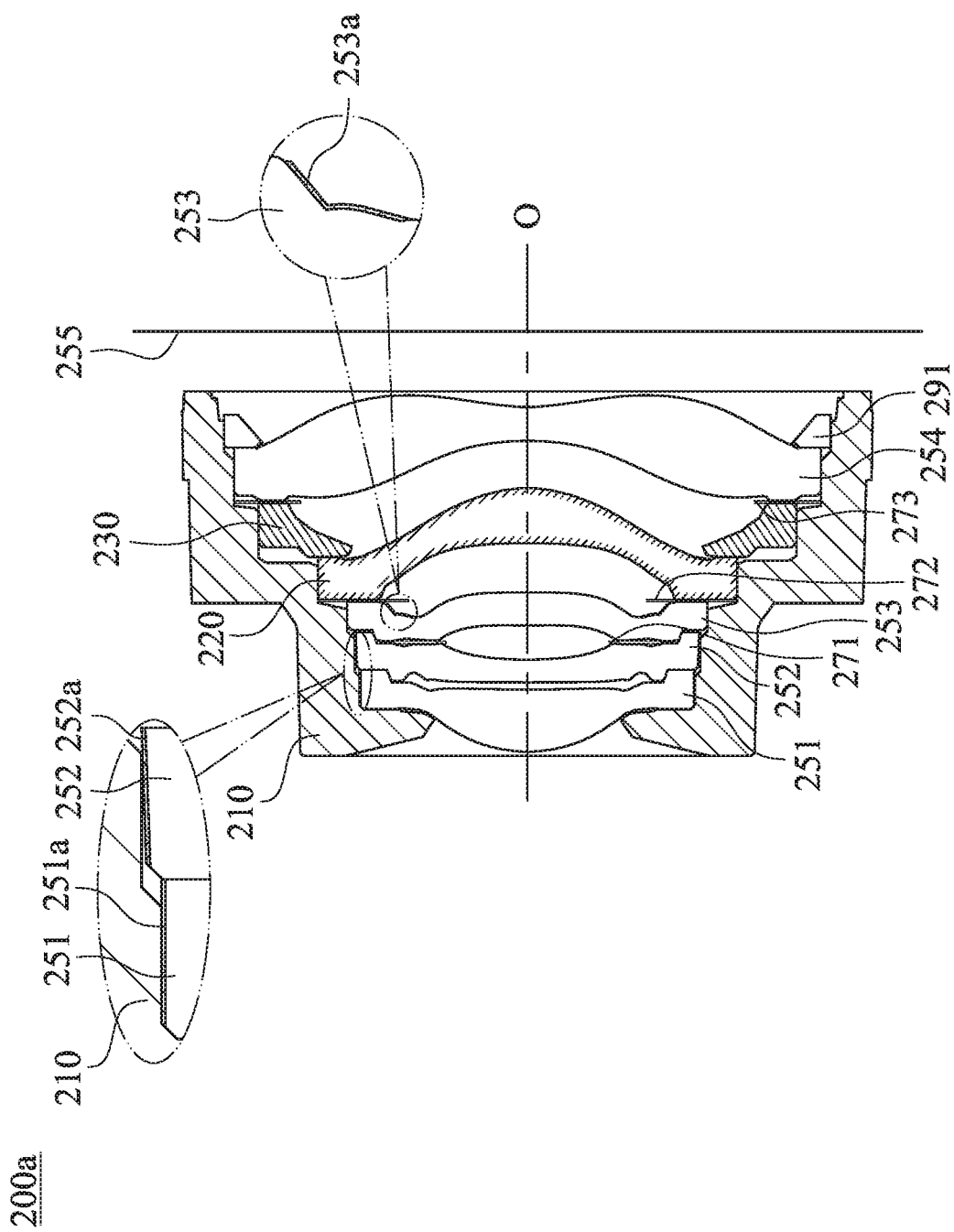

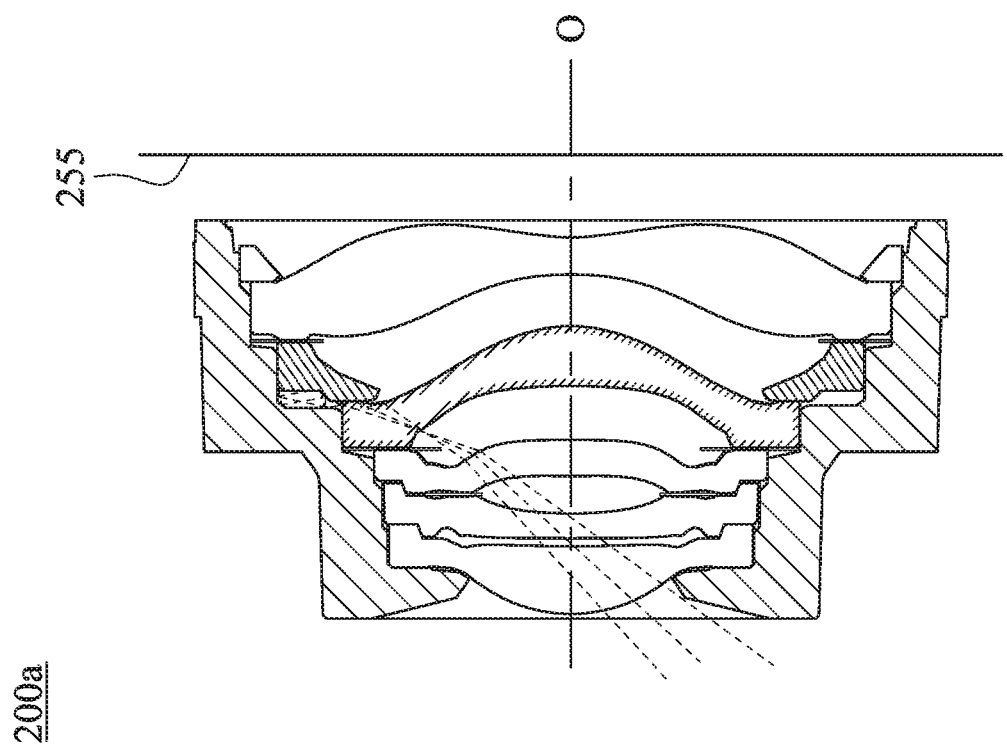

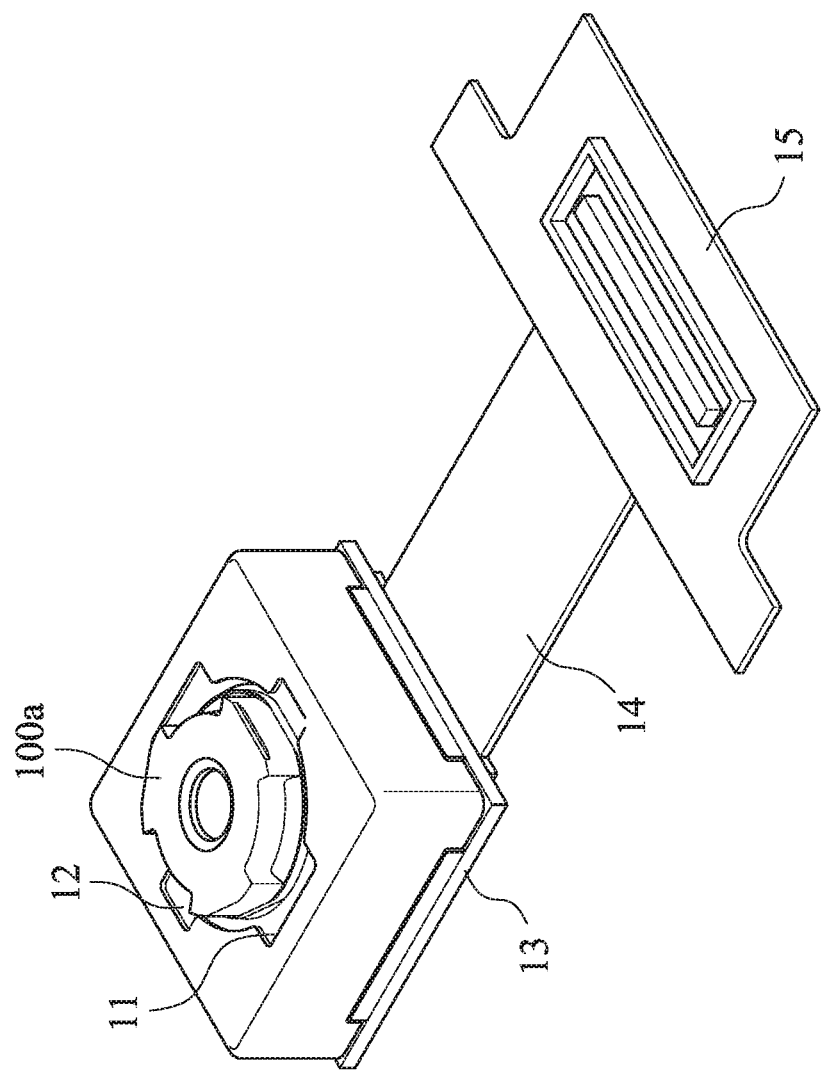

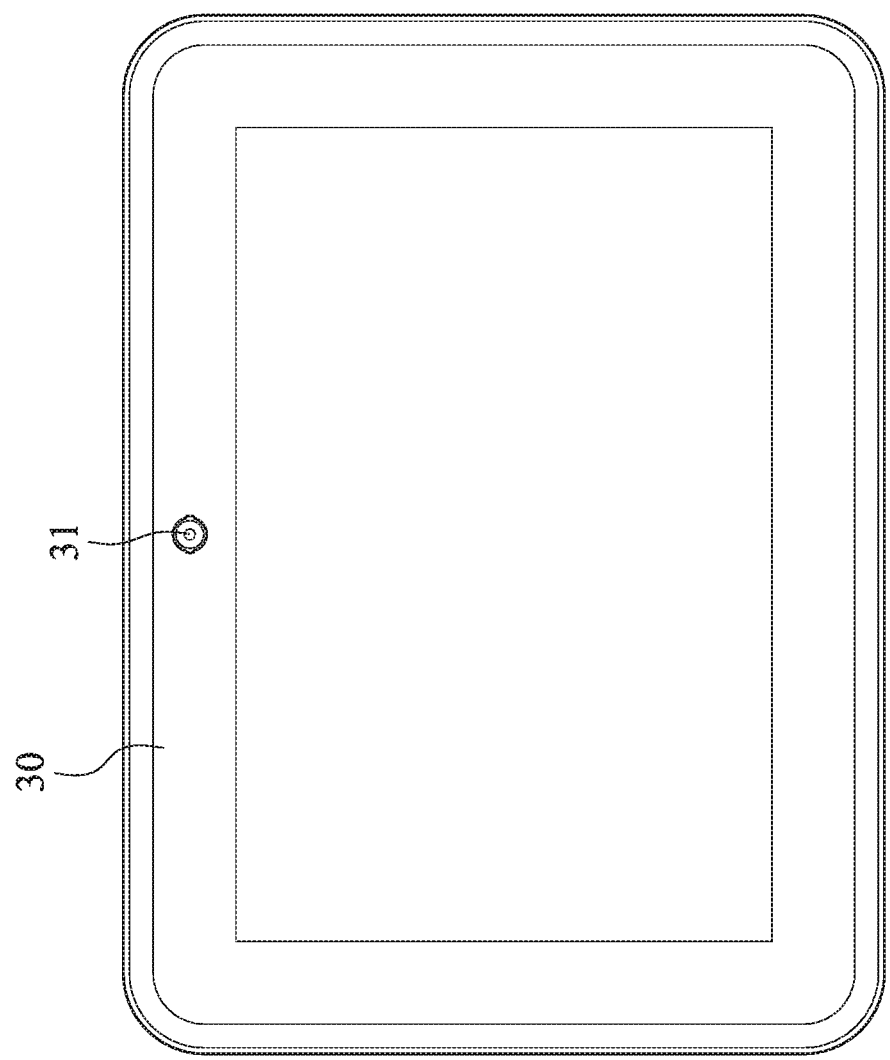

IMAGING LENS ASSEMBLY, CAMERA MODULE AND ELECTRONIC DEVICE

RELATED APPLICATIONS

The present application is a continuation of the U.S. application Ser. No. 16/558,202, filed Sep. 2, 2019, U.S. Pat. No. 10,564,382 issued on Feb. 18, 2020, which is a continuation of the U.S. application Ser. No. 15/869,359, filed Jan. 12, 2018, U.S. Pat. No. 10,444,464 issued on Oct. 15, 2019, and claims priority to Taiwan application serial number 106127359, filed Aug. 11, 2017, the entire contents of which are hereby incorporated herein by reference.

BACKGROUND

Technical Field

The present disclosure relates to an imaging lens assembly and a camera module. More particularly, the present disclosure relates to an imaging lens assembly and a camera module applicable to a portable electronic device.

Description of Related Art

With the popularity of personal electronic products and mobile communication products having camera functionalities, such as smart phones and tablet personal computers, compact imaging lens assemblies are in popular. The demand for compact imaging lens assemblies with high resolution and high image quality also increases significantly.

An imaging lens assembly includes a plastic barrel and a lens set, and the lens set is disposed in the plastic barrel. In general, the lens set includes optical elements, such as a plurality of lens elements, light blocking sheets and spacers. The lens elements are engaged with each other by engaging structures thereof or a spacer can be disposed therebetween for controlling a separation distance, so that the optical distance between the two lens elements is proper or damages caused by scraping and colliding between the two lens elements can be avoided. Moreover, a light blocking sheet can be disposed between two adjacent lens elements for blocking unnecessary lights in the imaging lens assembly.

Conventionally, a plastic barrel is formed in a straight cylindrical shape with a singular diameter, which is unfavorable for blocking unnecessary lights in the imaging lens assembly, and the image quality is interfered. For improving the drawbacks of the plastic barrel formed in the straight cylindrical shape, plastic barrels with different diameters are developed, wherein a diameter of an object-side end thereof is smaller than a diameter of an image-side end thereof (i.e., a structure with narrow front and wide back). Therefore, it is favorable for blocking unnecessary lights in the imaging lens assembly and improving the image quality. However, there still too many surface reflections exist in the engaging structures of the lens elements of the imaging lens assembly. Accordingly, the effect for eliminating the stray lights is limited.

FIG. 1A is a cross-sectional view of a conventional imaging lens assembly 1000. The conventional imaging lens assembly 1000 includes a plastic barrel 2000 and a lens set (its reference numeral is omitted), wherein the lens set is disposed in the plastic barrel 2000. The lens set includes, from an object side to an image side, a plastic lens element 3100, a plastic lens element 3200, a light blocking sheet 4100, a plastic lens element 3300, a light blocking sheet 4200, a spacer 5100, a plastic lens element 3400, a spacer 5200, a light blocking sheet 4300, a plastic lens element 3500, a fixing ring 5300 and an image surface 3600. The plastic lens element 3100, the plastic lens element 3200 and the plastic lens element 3300 are the front lens group, and the plastic lens element 3400 and the plastic lens element 3500 are the back lens group. When an incident light M1, an incident light M2 and an incident light M3 enter into the conventional imaging lens assembly 1000, surface reflections of the incident light M2 and the incident light M3 occur repeatedly in the engaging structures of the front lens group so as to form a reflected light R2 and a reflected light R3 projecting on the image surface 3600, and surface reflections of the incident light M1 occur repeatedly in the engaging structure of the back lens group so as to form a reflected light R1 projecting on the image surface 3600. As shown in FIG. 1A, although the plastic barrel 2000 is formed in the structure with narrow front and wide back, there still too many surface reflections exist in the engaging structures of the front lens group. The light paths of the surface reflections are excessively complicated and exist too many variables, it requires a plenty of time to analyze the light paths. As to the back lens group, the region other than the optical effective area is excessively large. Therefore, it tends to generate internal surface reflections. Accordingly, the effect for controlling and eliminating the stray lights is limited.

FIG. 1B is a schematic view showing forces when assembling the conventional imaging lens assembly 1000 in FIG. 1A. When assembling the conventional imaging lens assembly 1000, a force F1 is applied to the fixing ring 5300 for the press fit, and a feedback force occurs at where the optical elements abut against each other. Hereinafter, the feedback force F2 is an example of the feedback force of the force F1. Refer to FIG. 1C and FIG. 1D. FIG. 1C is a schematic view showing an indentation 4210 on the light blocking sheet 4200 in FIG. 1A. FIG. 1D is a schematic view showing an indentation 5110 on a spacer 5100 in FIG. 1A. As shown in FIG. 1C, the light blocking sheet 4200 is under an even force due to the feedback force F2, and the indentation 4210 is generated thereby. As a result, the light blocking sheet 4200 is damaged and cannot be recovered. In FIG. 1D, the spacer 5100 is to made of a flexible plastic material. The indentation 5110 is generated because the force on the spacer 5100 is not even due to the feedback force F2. That is, an irreversible flexure of the spacer 5100 is caused, which will indirectly result in a flexure of the neighboring lens element (i.e., the plastic lens element 3400). Accordingly, the shape of the optical effective area of the neighboring lens element is deformed, and the image quality is affected. If the spacer 5100 is made of a rigid plastic material for avoiding flexure, other drawbacks, such as high cost and difficulty of injection molding, are generated.

To sum up, how to control or eliminate the stray lights to improve the image quality, and how to improve the deformation of the plastic lens elements due to the press fit during the assembling process and to enhance the strength of the spacer, have drawn the attention of the relevant industry.

SUMMARY

According to one aspect of the present disclosure, an imaging lens assembly includes a plastic barrel and a lens set, wherein the lens set is disposed in the plastic barrel. The plastic barrel includes an object-side outer surface, a first inner surface and a second inner surface. The first inner surface is formed in the plastic barrel and is opposite to the object-side outer surface. The first inner surface surrounds an object-side opening. The second inner surface is formed in the plastic barrel and is located at an image side of the first inner surface. The second inner surface and the first inner surface are substantially parallel to each other. The lens set has an optical axis. The lens set includes, from an object side thereof to an image side thereof, at least one plastic lens element and a spacer. A light-absorbing to coating is disposed on the plastic lens element. The spacer includes a central hole, an object-side surface and an image-side surface. The central hole is coaxial with the object-side opening. The object-side surface surrounds the central hole. The object-side surface includes an object-side connecting surface and a relative surface. The object-side connecting surface is closer to the central hole than the relative surface. The object-side connecting surface and the relative surface are substantially parallel to each other. The object-side connecting surface is configured for connecting with a neighboring object-side optical element. When the object-side connecting surface is connected with the neighboring object-side optical element, the relative surface is out of touch with the neighboring object-side optical element. The image-side surface is opposite to the object-side surface. The image-side surface includes an image-side connecting surface. The image-side connecting surface is opposite to the relative surface. The image-side connecting surface is configured for connecting with a neighboring image-side optical element. There is an overlap between the second inner surface and the relative surface along a direction parallel to the optical axis. The light-absorbing coating is closer to the optical axis than the object-side connecting surface.

According to another aspect of the present disclosure, a camera module includes the imaging lens assembly according to the aforementioned aspect and an image sensor. The image sensor is disposed on an image surface of the imaging lens assembly.

According to further another aspect of the present disclosure, an electronic device includes the camera module according to the aforementioned to aspect.

BRIEF DESCRIPTION OF THE DRAWINGS

The present disclosure can be more fully understood by reading the following detailed description of the embodiments, with reference made to the accompanying drawings as follows:

FIG. 2J is an exploded view of the imaging lens assembly in FIG. 2H;

FIG. 3C is a cross-sectional view of an imaging lens assembly according to the 2nd example of the present disclosure;

FIG. 3D is a schematic view showing light paths of the imaging lens assembly in FIG. 3C.

FIG. 5 is a schematic view of a camera module according to the 4th example of the present disclosure;

FIG. 7 is a schematic view of an electronic device according to the 6th example of the present disclosure.

DETAILED DESCRIPTION

Imaging Lens Assembly

1st Embodiment

Figure 2A:
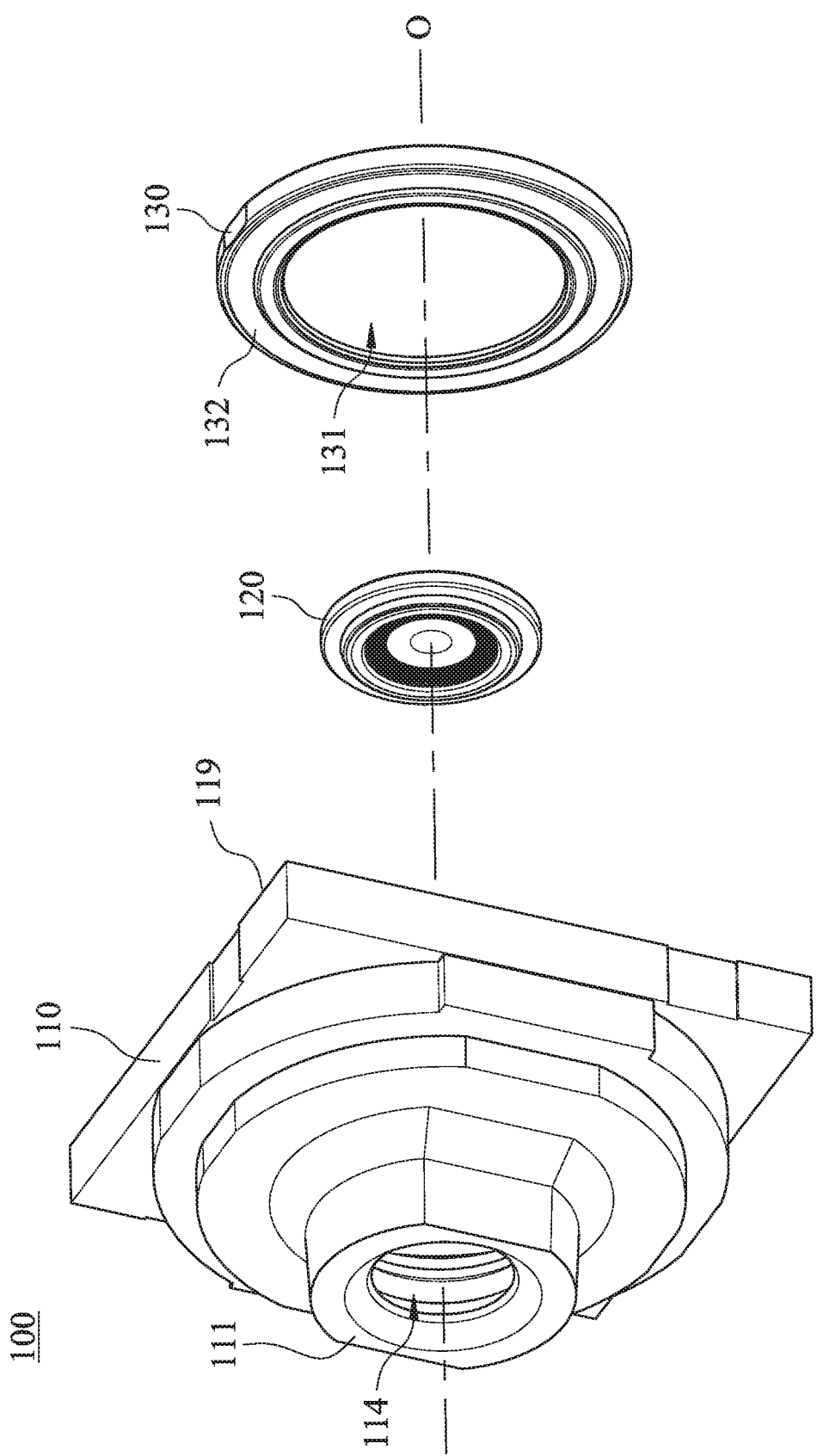
FIG. 2A is an exploded view of an imaging lens assembly according to the 1st embodiment of the present disclosure.
Figure 2B:
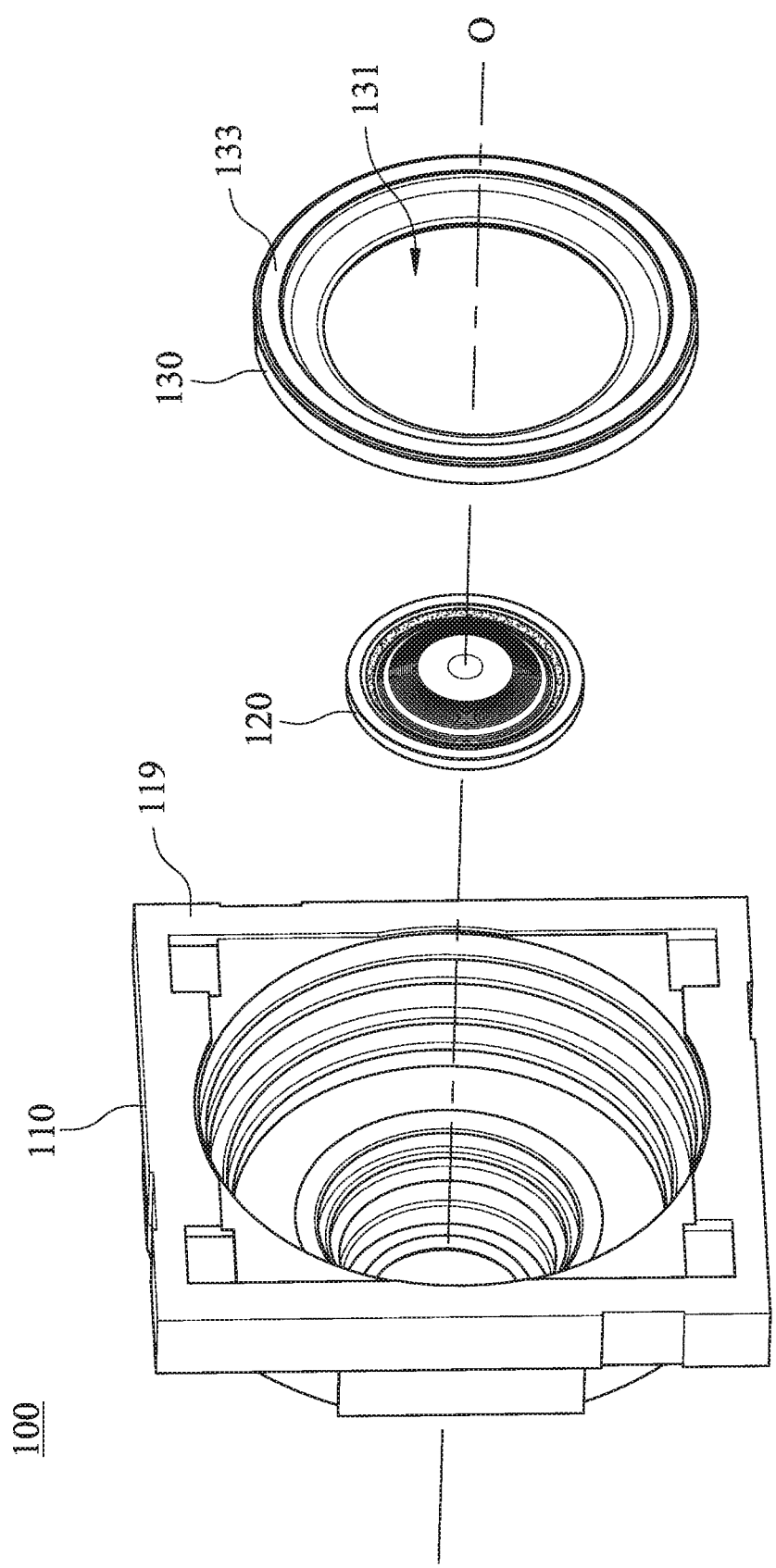
FIG. 2B is another exploded view of the imaging lens assembly in FIG. 2A.
Figure 2C:
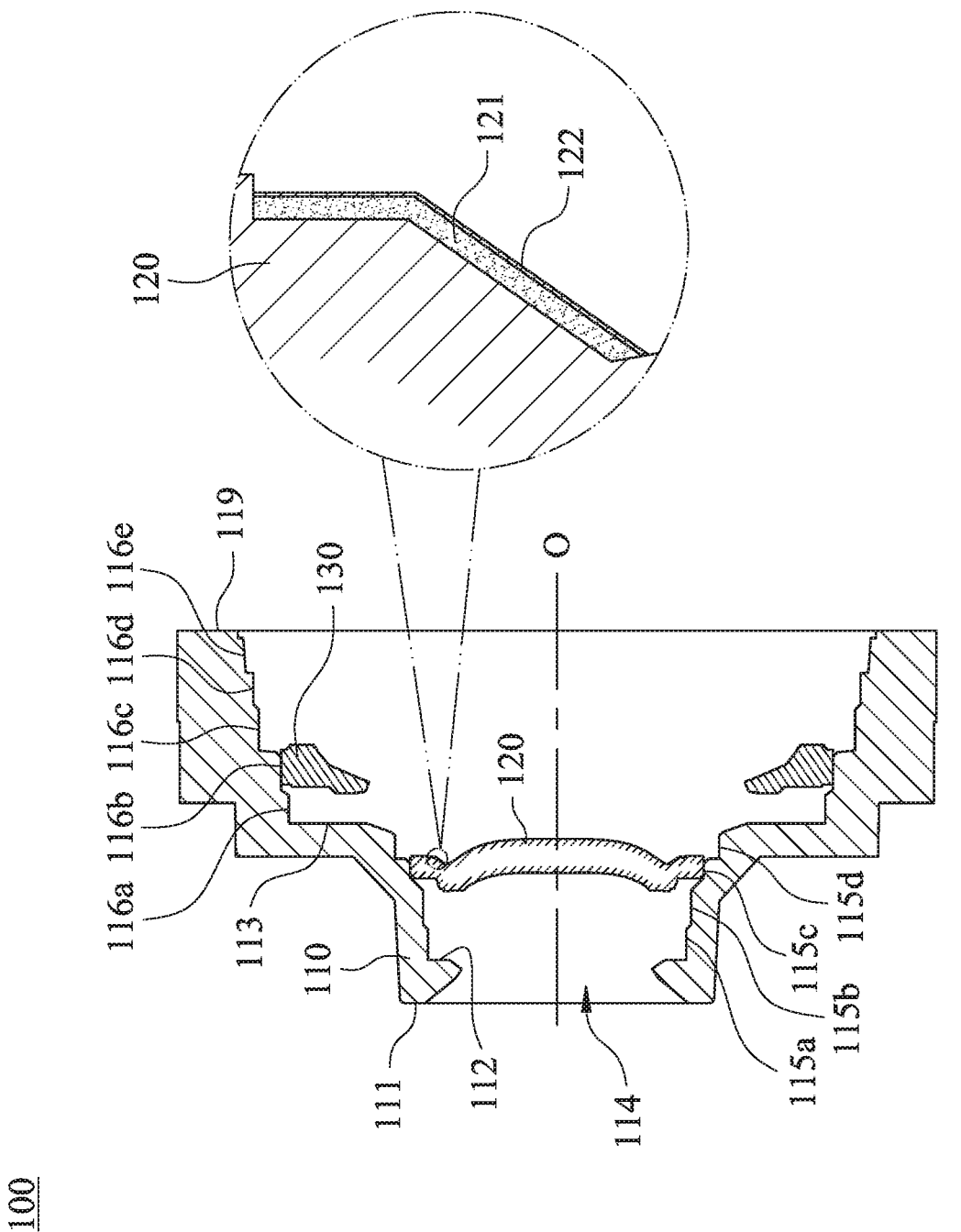
FIG. 2C is a cross-sectional view of the imaging lens assembly in FIG. 2A in a combined state.
Figure 2D:
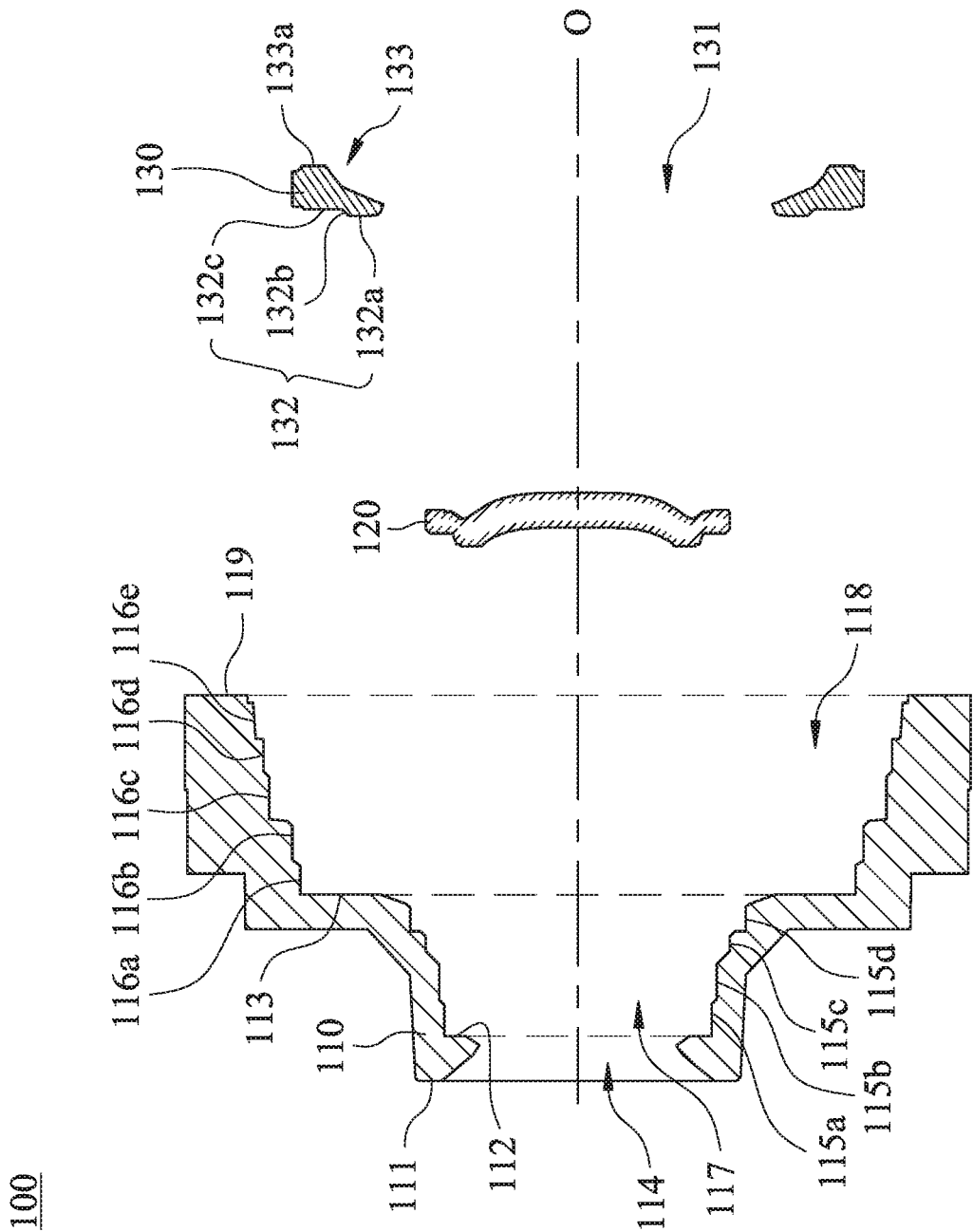
FIG. 2D is a cross-sectional view of the imaging lens assembly in FIG. 2C in a separated state.

FIG. 2A is an exploded view of an imaging lens assembly 100 according to the 1st embodiment of the present disclosure. FIG. 2B is another exploded view of the imaging lens assembly 100 in FIG. 2A. FIG. 2C is a cross-sectional view of the imaging lens assembly 100 in FIG. 2A in a combined state. FIG. 2D is a cross-sectional view of the imaging lens assembly 100 in FIG. 2C in a separated state. In FIG. 2A to FIG. 2D, the imaging lens assembly 100 includes a plastic barrel 110 and a lens set (its reference numeral is omitted), and the lens set is disposed in the plastic barrel 110. The lens set has an optical axis O and includes, from an object side thereof to an image side thereof, at least one plastic lens element 120 and a spacer 130.

The plastic barrel 110 includes an object-side outer surface 111, an object-side opening 114, a first inner surface 112 and a second inner surface 113. The object-side outer surface 111 is a surface of the plastic barrel 110 closest to an object side of the plastic barrel 110. The first inner surface 112 is formed in the plastic barrel 110 and is opposite to the object-side outer surface 111. The first inner surface 112 surrounds the object-side opening 114. The second inner surface 113 is formed in the plastic barrel 110 and is located at an image side of the first inner surface 112. The second inner surface 113 and the first inner surface 112 are substantially parallel to each other.

In FIG. 2C, a light-absorbing coating 121 is disposed on the plastic lens element 120. Specifically, the light-absorbing coating 121 is partially disposed on an image-side surface (its reference numeral is omitted) of the plastic lens element 120. The term "light-absorbing" refers to the ability to absorb light in a wavelength range of 400 nm to 700 nm (i.e., the visible light), which can reduce the transmittance of the visible light to less than 50%. The light-absorbing coating 121 can be an oil-based coating. The oil-based coating can be a quick dry ink including a basic material of resin, epoxy or acrylic. Alternatively, the oil-based coating can be a mixture of light curing glue and dark color pigment particles. How to reduce the transmittance of the visible light to less than 50% is conventional, and is not described herein.

In FIG. 2D, the spacer 130 includes a central hole 131, an object-side surface 132 and an image-side surface 133. The central hole 131 is coaxial with the object-side opening 114. The object-side surface 132 surrounds the central hole 131. The object-side surface 132 includes an object-side connecting surface 132a and a relative surface 132c. The object-side connecting surface 132a is closer to the central hole 131 than the relative surface 132c, and the object-side connecting surface 132a and the relative surface 132c are substantially parallel to each other. The object-side connecting surface 132a is configured for connecting with a neighboring object-side optical element (not shown). When the object-side connecting surface 132a is connected with the neighboring object-side optical element, the relative surface 132c is out of touch with the neighboring object-side optical element (which can refer to FIG. 2G and FIG. 2H). The image-side surface 133 is opposite to the object-side surface 132, wherein the image-side surface 133 includes an image-side connecting surface 133a. The image-side connecting surface 133a is opposite to the relative surface 132c, and the image-side connecting surface 133a is configured for connecting with a neighboring image-side optical element (not shown). There is an overlap between the second inner surface 113 and the relative surface 132c along a direction parallel to the optical axis O. The light-absorbing coating 121 is closer to the optical axis O than the object-side connecting surface 132a. With the configuration of the first inner surface 112 and the second inner surface 113, the shape of the plastic barrel 110 is different from the straight cylindrical shape of a conventional plastic barrel, which provides a proper basis to dispose the light trap structure (its reference numeral is omitted). With the structural coordination of the plastic barrel 110 and the spacer 130, the light trap structure for eliminating stray lights can be formed. The light trap structure can refer to FIG. 2G and the relevant description thereof.

According to the present disclosure, each element has an object side and an image side. Whether a side of an element is regarded as an object side or an image side is determined by the position of the side relative to the element. Specifically, when a side of the element is closer to an imaged object than the element, the side is regarded as an object side. Similarly, when a side of the element is closer to an image surface than the element, the side is regarded as an image side. The aforementioned "neighboring object-side optical element" refers to an optical element located at an object side of the spacer 130 and adjacent to the spacer 130. The neighboring object-side optical element can be a plastic lens element, another spacer, a light blocking sheet or a fixing ring of the lens set. The aforementioned "neighboring image-side optical element" refers to an optical element located at an image side of the spacer 130 and adjacent to the spacer 130. The neighboring image-side optical element can be a plastic lens element, another spacer, a light blocking sheet or a fixing ring of the lens set. The aforementioned "substantially parallel to each other" refers that two surfaces (such as the second inner surface 113 and the first inner surface 112) are supposed to be parallel to each other. However, the manufacturing result or the effect of other factors make the parallel between the two surfaces imperfect. Specifically, when an angle between the two surfaces is 0 degree or 180 degrees, the two surfaces are regarded as parallel to each other; when the angle between the two surfaces is 0±5 degree or 180±5 degrees, the two surfaces are regarded as substantially parallel to each other. Preferably, when the angle between the two surfaces is 0±3 degree or 180±3 degrees, the two surfaces are regarded as substantially parallel to each other.

Other technical features of the imaging lens assembly 100 are specified in detail hereinafter. With the following technical features, the ability for eliminating stray lights and other property of the imaging lens assembly 100 can be improved.

In FIG. 2C and FIG. 2D, the plastic barrel 110 further includes a plurality of inner side surfaces, which are an inner side surface 115a, an inner side surface 115b, an inner side surface 115c, an inner side surface 115d, an inner side surface 116a, an inner side surface 116b, an inner side surface 116c, an inner side surface 116d and an inner side surface 116e, respectively. As shown in FIG. 2C and FIG. 2D, each of the inner side surfaces (115a-115d, 116a-116e) is coaxial with the object-side opening 114 and is parallel to the optical axis O, and each of the inner side surfaces is connected with the first inner surface 112, the second inner surface 113 or another inner side surface. For example, the inner side surface 115a is connected with the first inner surface 112 and the inner side surface 115b, respectively; the inner side surface 115b is connected with the inner side surface 115a and the inner side surface 115c, respectively; the inner side surface 115c is connected with the inner side surface 115b and the inner side surface 115d, respectively; the inner side surface 115d is connected with the inner side surface 115c and the second inner surface 113, respectively. The connecting relationships of the rest inner side surfaces (116a-116e) can be deduced by analogy, and are not described herein. A first accommodating space 117 is defined by the first inner surface 112 and the inner side surfaces (115a-115d) located at an object side of the second inner surface 113. A second accommodating space 118 is defined by the second inner surface 113 and the inner side surfaces (116a-116e) located at an image side of the second inner surface 113. The first accommodating space 117 is configured for accommodating plastic lens elements with small outer diameter, such as the plastic lens element 120. The second accommodating space 118 is configured for accommodating plastic lens elements with large outer diameter (which can refer to FIG. 2G and FIG. 2H).

In FIG. 2C and FIG. 2D, there is no overlap between the second inner surface 113 and the object-side outer surface 111 along the direction parallel to the optical axis O. Therefore, the volume of the plastic lens element (such as the plastic lens element 120) can be reduced significantly, and the uncertainty of the light paths of stray lights can be reduced. In other embodiments, there can be no overlap between a portion of the second inner surface 113 away from the optical axis O and the object-side outer surface 111 along the direction parallel to the optical axis O (refer to FIG. 3A and FIG. 4A). Therefore, surface reflections of the stray lights inside the plastic lens element can be reduced, which is favorable for controlling the influence range of the stray lights. In the paragraph, the plastic lens element can be the plastic lens element 120 or other plastic lens elements of the lens set with reduced volume.

Furthermore, the object-side opening 114 of the plastic barrel 110 can be configured to be an aperture of the lens set. Therefore, the aperture of the imaging lens assembly 100 (also the aperture of the lens set) can be modified by modifying the mold of the plastic barrel 110, which is favorable for mass production.

In FIG. 2A and FIG. 2B, an end 119 of the plastic barrel 110 closest to an image side of the plastic barrel 110 can be a quadrangular structure. Therefore, the imaging lens assembly 100 can be directly assembled with a filter (not shown) or an image sensor (not shown), which can effectively reduce the number of extra components.

In FIG. 2C, the plastic lens element 120 can further include a silicon dioxide coating 122. The silicon dioxide coating 122 is disposed on the light-absorbing coating 121. Therefore, the light-absorbing coating 121 can be isolated from the air and be protected, and the oxidation, discoloration and degradation of the light-absorbing coating 121 can be prevented. However, the present disclosure is not limited thereto. In other embodiments, there can be no silicon dioxide coating disposed on the light-absorbing coating.

Figure 1B:
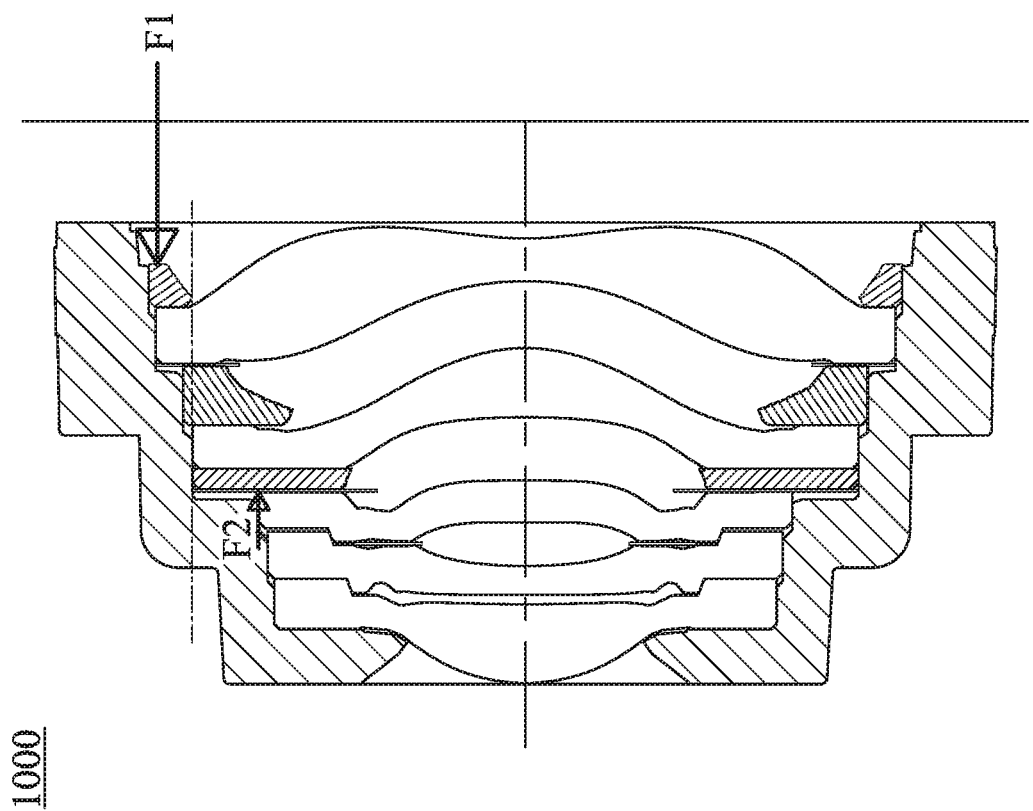
FIG. 1B is a schematic view showing forces when assembling the conventional imaging lens assembly in FIG. 1A.
Figure 1D:
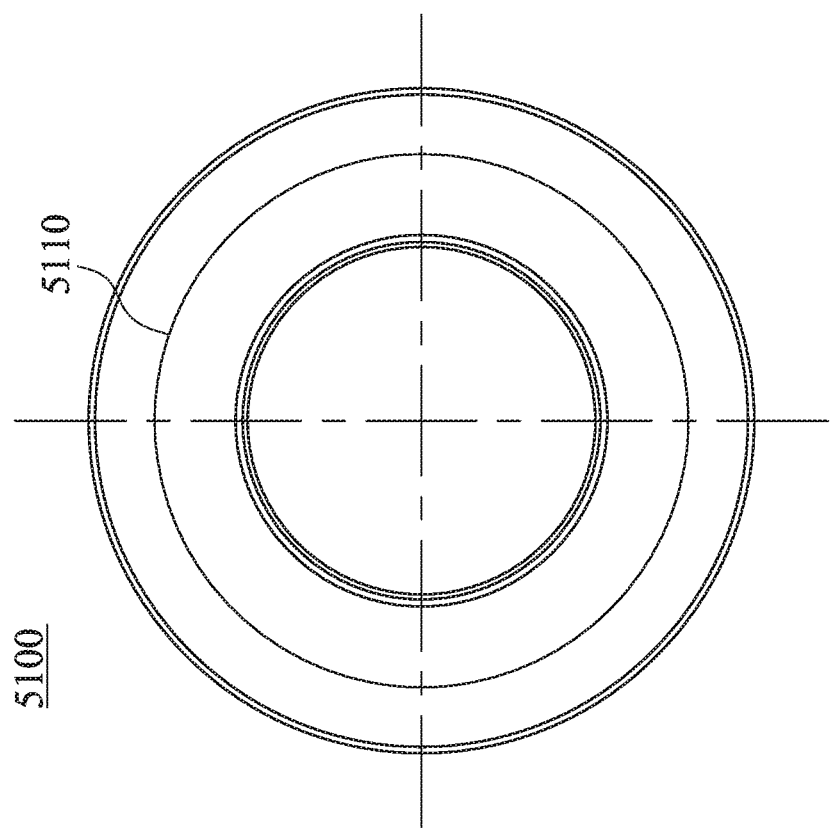
FIG. 1D is a schematic view showing an indentation on a spacer in FIG. 1A.
Figure 1C:
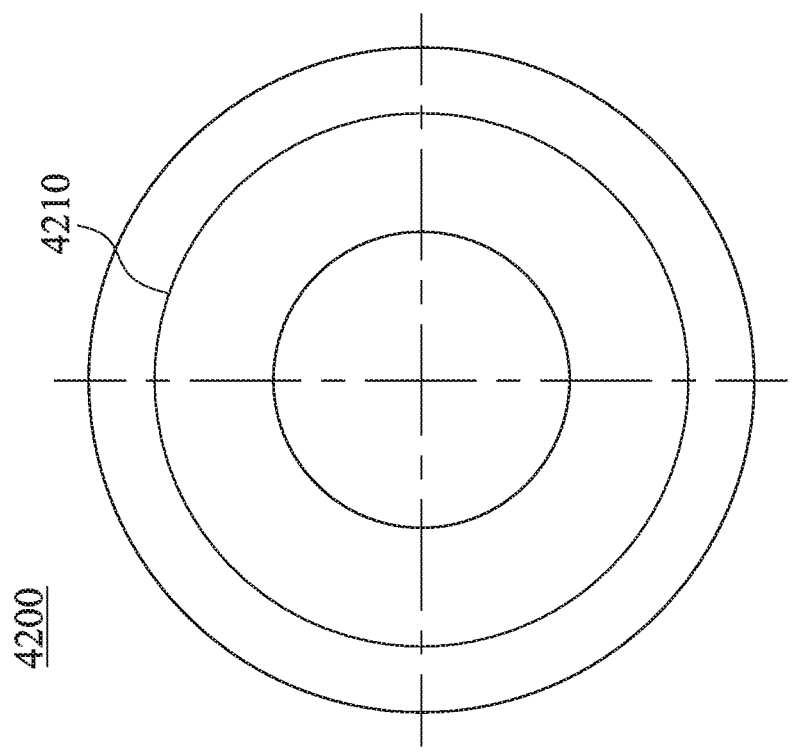
FIG. 1C is a schematic view showing an indentation on a light blocking sheet in FIG. 1A.
Figure 2E:
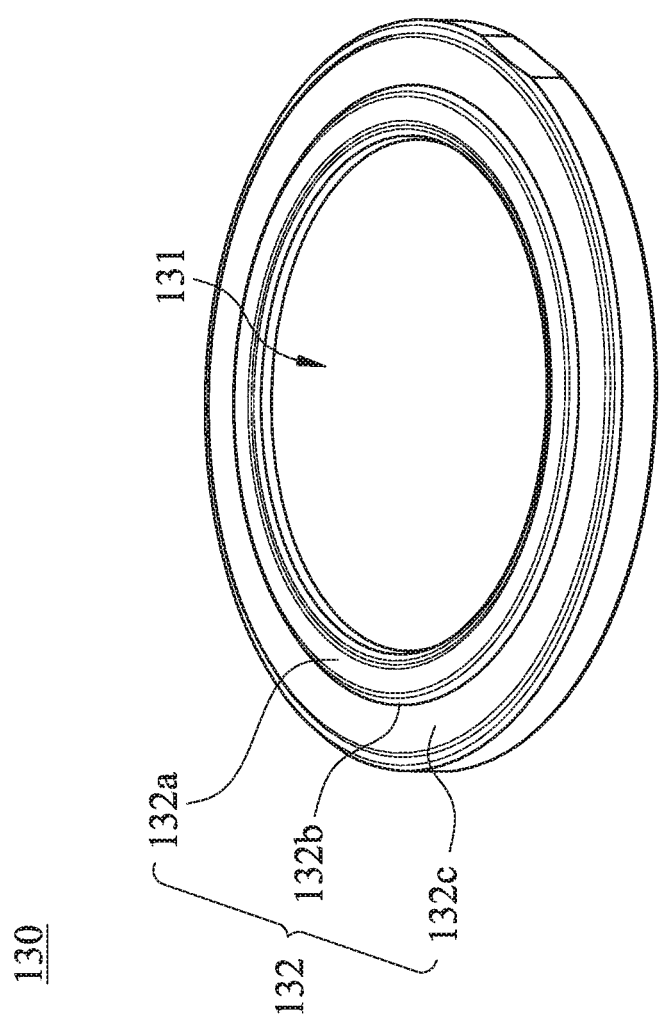
FIG. 2E is a three-dimensional view of a spacer in FIG. 2A.

Refer to FIG. 2E and FIG. 2D. FIG. 2E is a three-dimensional view of the spacer 130 in FIG. 2A. The object-side surface 132 of the spacer 130 further includes a conical surface 132b disposed between the object-side connecting surface 132a and the relative surface 132c, and the conical surface 132b is tapered along a direction from the image side of the spacer 130 to the object side of the spacer 130. Therefore, a proper structural strength of the spacer 130 can be provided, and the pressure endurance thereof can be enhanced. Accordingly, the deformation of the plastic lens element due to the press fit during the assembling process (shown in FIG. 1B) can be prevented, and the image quality can be maintained.

Figure 2F:
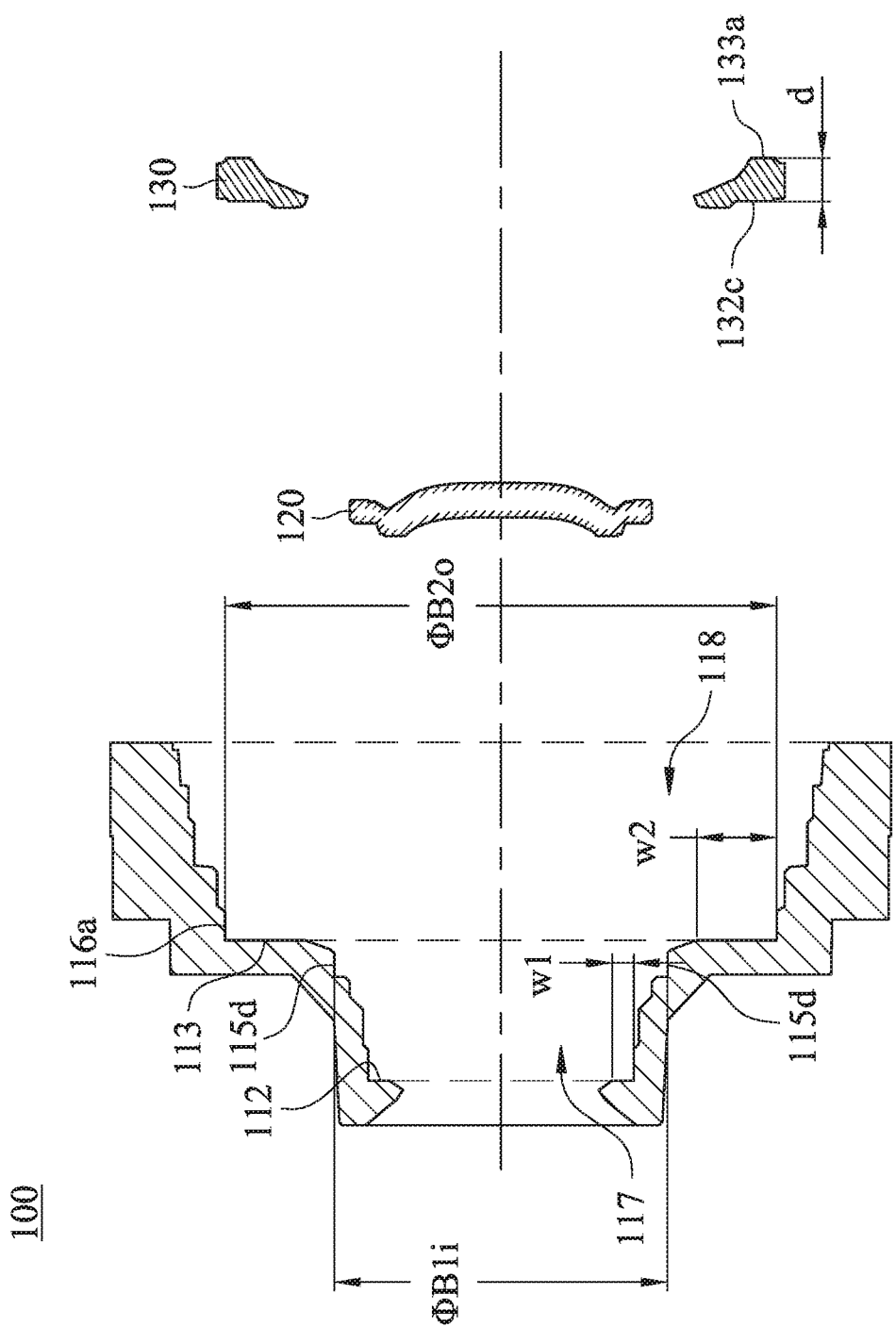
FIG. 2F is a schematic view showing parameters of the imaging lens assembly in FIG. 2A.

Refer to FIG. 2F, which is a schematic view showing parameters of the imaging lens assembly 100 in FIG. 2A. When a diameter of the inner side surface in the first accommodating space 117 closest to the image side of the plastic barrel 110 is $\phi$B1i (i.e., the inner side surface 115d in the embodiment), and a diameter of the inner side surface in the second accommodating space 118 closest to the object side of the plastic barrel 110 is $\phi$B2o (i.e., the inner side surface 116a in the embodiment), the following condition can be satisfied: $1.27<\phi B2o/\phi B1i<2.0$. Therefore, it is favorable for forming the light trap structure, and a depth of the light trap structure can be increased.

In FIG. 2F, when a width of the second inner surface 113 is w2, and a width of the first inner surface 112 is w1, the following condition can be satisfied: $1.0<w2/w1<6.5$. Therefore, the depth of the light trap structure can be increased, which is favorable for capturing the stray lights and preventing the stray lights to escape therefrom. Preferably, the following condition can be satisfied: $2.0<w2/w1<5.5$.

In FIG. 2F, when a thickness of the spacer 130 between the relative surface 132c and the image-side connecting surface 133a is d, the following condition can be satisfied: $0.15\ mm<d<0.75\ mm$. Therefore, the thickness of the spacer 130 between the relative surface 132c and the image-side connecting surface 133a is proper. When the thickness of the spacer 130 is excessively thin, the deformation of the spacer 130 due to the press fit during the assembling process may be caused. When the thickness of the spacer 130 is excessively thick, the distortion and the warpage of the spacer 130 may be caused during the injection molding process.

Figure 2G:
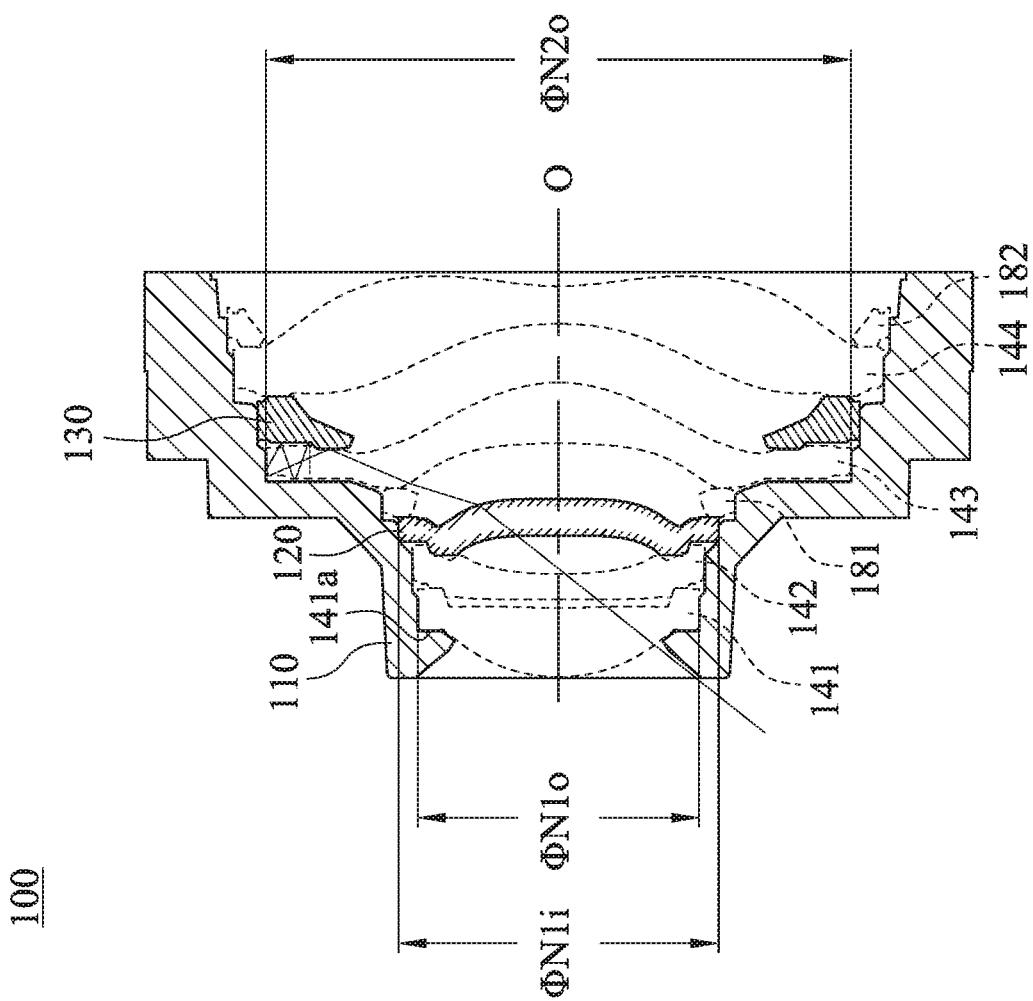
FIG. 2G is a schematic view showing a use state of the imaging lens assembly in FIG. 2A.

Refer to FIG. 2G, which is a schematic view showing a use state of the imaging lens assembly 100 in FIG. 2A. The imaging lens assembly 100 can further include other optical elements. In FIG. 2G, the other optical elements of the imaging lens assembly 100 are, in order from an object side to an image side, a plastic lens element 141, a plastic lens element 142, a spacer 181, a plastic lens element 143, a plastic lens element 144 and a spacer 182. In FIG. 2G, the other optical elements of the imaging lens assembly 100 are drawn in dash line, which shows the other optical elements shown in FIG. 2G are not necessary and the present disclosure is not limited thereto. In practical, the other optical elements can be chosen according to the practical needs. The other optical elements can be plastic lens elements with a desired surface shape, size and refractive power, light blocking sheets with a desired surface property and structure, spacers with a desired surface property and structure, and fixing rings with a desired surface property and structure.

Refer to FIG. 2G and FIG. 2D. In FIG. 2G, when the stray lights enter into the imaging lens assembly 100, multiple surface reflections of the stray lights occur between the second inner surface 113, the inner side surface 116a and the object-side surface 132 of the spacer 130. Eventually, the stray lights decay or disappear due to the energy consumption caused by each surface refection. It shows that the light trap structure (such as the space between the second inner surface 113, the inner side surface 116a, and the object-side surface 132 of the spacer 130) can be formed in the imaging lens assembly 100, which is favorable for capturing the stray lights and preventing the stray lights to escape therefrom. Accordingly, the stray lights can be eliminating effectively.

In FIG. 2G, the second inner surface 113 is out of touch with the lens set. That is, there is an air space between the second inner surface 113 and the plastic lens element 143 adjacent thereto. Therefore, the efficiency for eliminating the stray lights of the light trap structure can be enhanced, and the efficiency for eliminating the stray lights of the light trap structure interfered by other optical elements can be prevented.

Refer to FIG. 2G and FIG. 2D. In FIG. 2G, when the object-side connecting surface 132a is connected with the neighboring object-side optical element (i.e., the plastic lens element 143), the conical surface 132b can be out of touch with the neighboring object-side optical element (i.e., the plastic lens element 143). Therefore, the efficiency for eliminating the stray lights of the light trap structure can be enhanced, and the efficiency for eliminating the stray lights of the light trap structure interfered by other optical elements can be prevented.

Refer to FIG. 2G and FIG. 2D. In FIG. 2G, when an outer diameter of the plastic lens element (i.e., the plastic lens element 120) in the first accommodating space 117 closest to the image side of the plastic barrel 110 is $\phi$N1i, and an outer diameter of the plastic lens element (i.e., the plastic lens element 143) in the second accommodating space 118 closest to the object side of the plastic barrel 110 is $\phi$N2o, the following condition can be satisfied: $1.35<\phi N2o/\phi N1i<2.2$. Therefore, the outer diameter of the plastic lens element 120 can be reduced, which is correspondent to the shape of the plastic barrel 110.

Refer to FIG. 2G and FIG. 2D. In FIG. 2G, when an outer diameter of the plastic lens element (i.e., the plastic lens element 141) in the first accommodating space 117 closest to the object side of the plastic barrel 110 is φN1o, and the outer diameter of the plastic lens element (i.e., the plastic lens element 120) in the first accommodating space 117 closest to the image side of the plastic barrel 110 is φN1i, the following condition can be satisfied: 1.0<φN1i/φN1o<1.28. Therefore, the number of the plastic lens elements (i.e., the plastic lens element 141, the plastic lens element 142 and the plastic lens element 120) with reduced outer diameter can be increased.

Refer to FIG. 2G and FIG. 2D. In FIG. 2G, when the outer diameter of the plastic lens element (i.e., the plastic lens element 120) in the first accommodating space 117 closest to the image side of the plastic barrel 110 is φN1i, and an outer diameter of the plastic lens element (i.e., the plastic lens element 143) in the second accommodating space 118 closest to the object side of the plastic barrel 110 is φN2o, the following condition can be satisfied: 1.50<φN2o/φN1i. Therefore, the reducing degree of the outer diameter of the plastic lens elements (i.e., the plastic lens element 141, the plastic lens element 142 and the plastic lens element 120) can be increased, which is favorable for predicting the light paths of the stray lights.

When a total number of the plastic lens elements of the lens set is N, a number of the plastic lens elements with small outer diameter of the lens set is N1, a number of the plastic lens elements with large outer diameter of the lens set is N2, N1 is a positive integer from 1 to N−1, an outer diameter of each of the plastic lens elements with small outer diameter is φN1m, m is a positive integer from 1 to N−1, an outer diameter of each of the plastic lens elements with large outer diameter is φN2n, and n is a positive integer from 1 to N2, the following conditions can be satisfied: 5≤N<10; N=N1+N2; 2.8 mm<φN1m<3.8 mm; and 4.7 mm<φN2n<7.0 mm. Therefore, the difference of the outer diameter of the plastic lens elements with large outer diameter and the outer diameter of the plastic lens elements with small outer diameter is apparent, which is favorable for forming the light trap structure. The phrase "the plastic lens elements with small outer diameter" refers to the plastic lens elements disposed in the first accommodating space 117. The phrase "the plastic lens elements with large outer diameter" refers to the plastic lens elements disposed in the second accommodating space 118. The phrase "N1 is a positive integer from 1 to N−1" refers that a minimum of N1 is 1 and a maximum of N1 is N−1. In other words, a minimum of N2 is 1 and a maximum of N2 is N−1 (deduced from the condition "N=N1+N2"). That is, the lens set includes the plastic lens elements with small outer diameter and the plastic lens elements with large outer diameter at the same time. Take FIG. 2G for example. In FIG. 2G, the number of the plastic lens elements (i.e., the plastic lens element 141, the plastic lens element 142, the plastic lens element 143, the plastic lens element 144 and the plastic lens element 120) is 5, that is, N=5. The number of the plastic lens elements (i.e., the plastic lens element 141, the plastic lens element 142 and the plastic lens element 120) with small outer diameter is 3, that is, N1=3. The outer diameter of the plastic lens elements with small outer diameter are φN11, φN12 and φN13, respectively. The number of the plastic lens elements (i.e., the plastic lens element 143 and the plastic lens element 144) with large outer diameter is 2, that is, N2=2. The outer diameter of the plastic lens elements with large outer diameter are φN21 and φN22, respectively.

When the number of the plastic lens elements with small outer diameter of the lens set is N1, the following condition can be satisfied: 3≤N1. Therefore, there are more plastic lens elements with simpler stray light paths, which is favorable for reducing the stray lights. Moreover, the following condition can be satisfied: 4≤N1.

According to the present disclosure, the plastic lens elements in the first accommodating space 117 refer to the plastic lens elements disposed in the first accommodating space 117. Specifically, whether a plastic lens element is disposed in the first accommodating space 117 is determined by the location of the outer diameter surface (its reference numeral is omitted) of the plastic lens element. As long as the outer diameter surface of the plastic lens element is to contacted with one of the inner side surfaces (115a-115d) located at the object side of the second inner surface 113, the plastic lens element is regarded as the plastic lens element in the first accommodating space 117, even the portion of the plastic lens element closed to the optical axis O is located in the second accommodating space 118. Similarly, the plastic lens elements in the second accommodating space 118 refer to the plastic lens elements disposed in the second accommodating space 118. Specifically, whether a plastic lens element is disposed in the second accommodating space 118 is determined by the location of the outer diameter surface (its reference numeral is omitted) of the plastic lens element. As long as the outer diameter surface of the plastic lens element is contacted with one of the inner side surfaces (116a-116e) located at the image side of the second inner surface 113, the plastic lens element is regarded as the plastic lens element in the second accommodating space 118, even the portion of the plastic lens element closed to the optical axis O is located in the first accommodating space 117.

In FIG. 2G, the first inner surface 112 is connected with an object-side connecting surface 141a of the plastic lens element (i.e., the plastic lens element 141) closest to the object side of the plastic barrel 110.

Figure 2H:
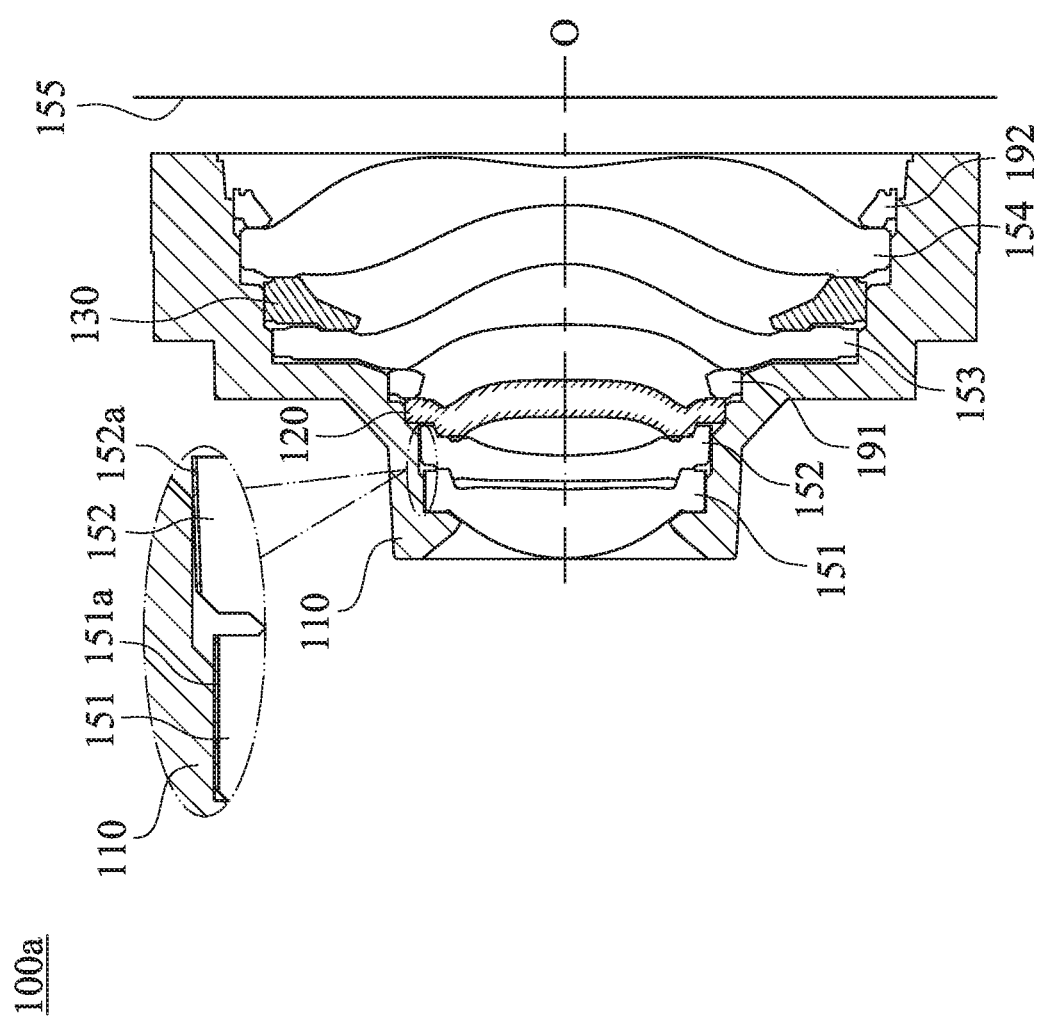
FIG. 2H is a cross-sectional view of an imaging lens assembly according to the 1st example of the present disclosure.
Figure 2I:
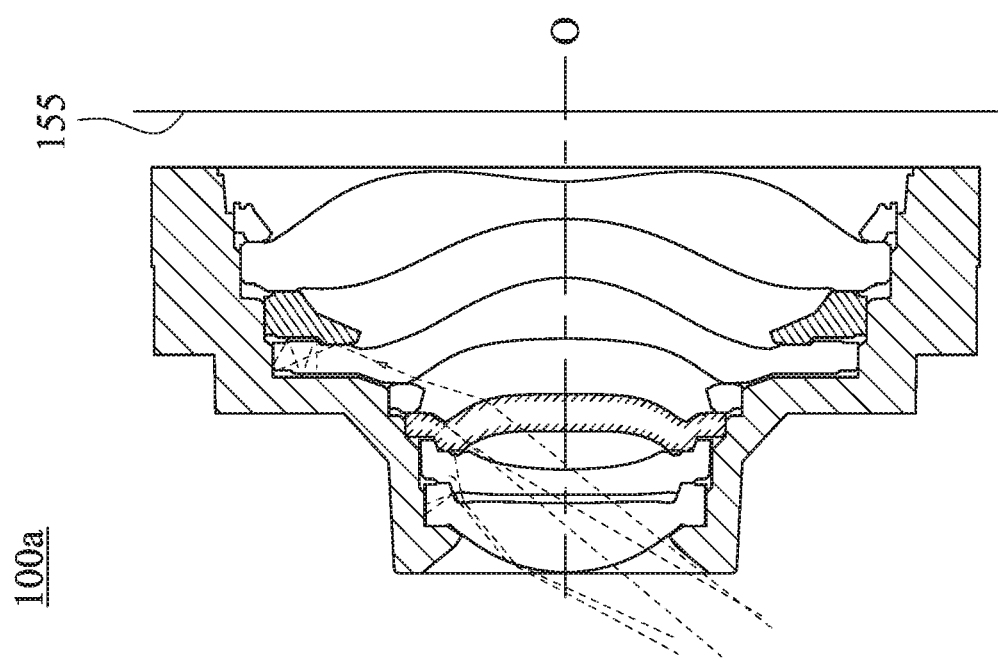
FIG. 2I is a schematic view showing light paths of the imaging lens assembly in FIG. 2H.
Figure 2K:
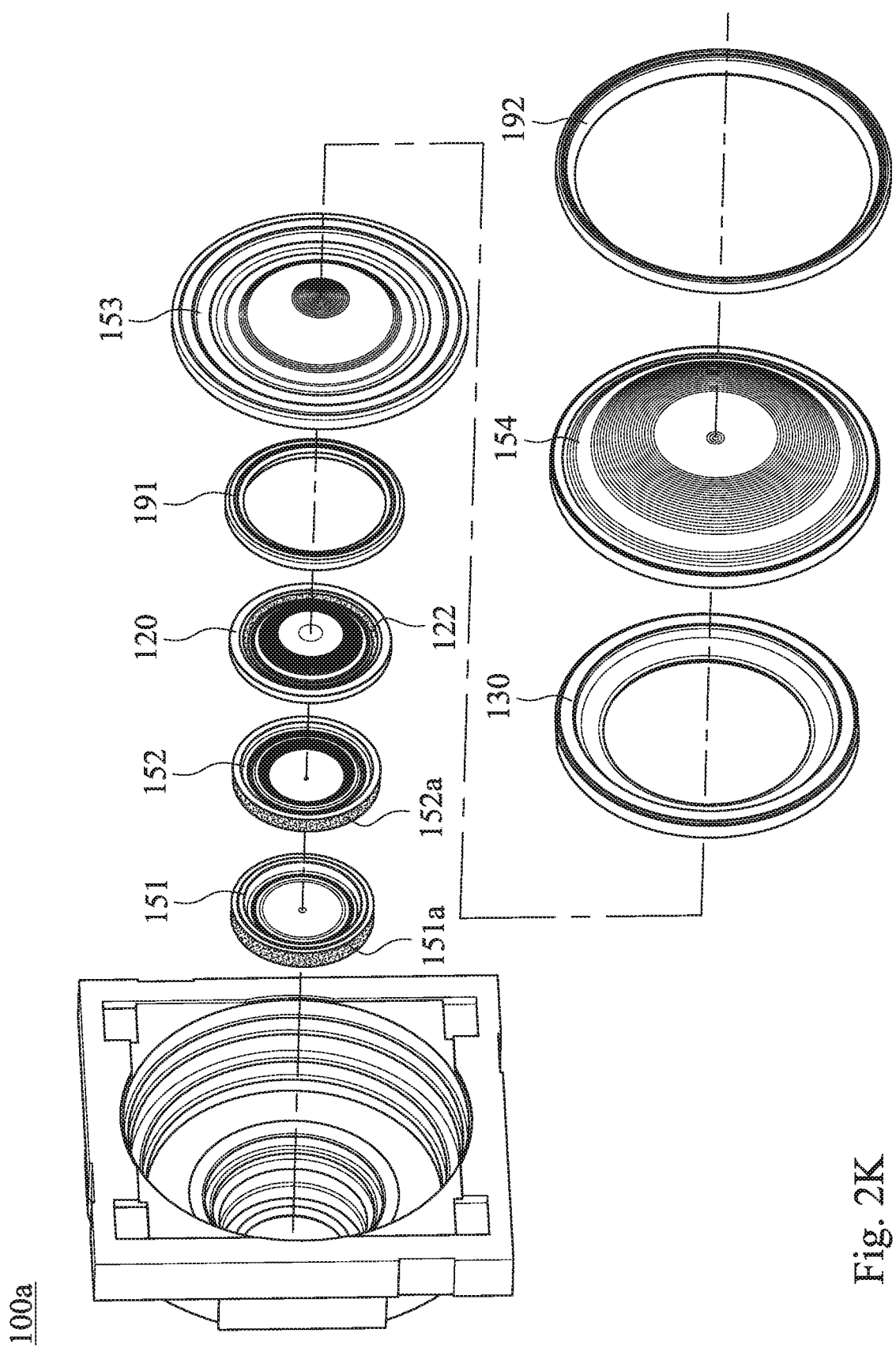
FIG. 2K is another exploded view of the imaging lens assembly in FIG. 2J.

FIG. 2H is a cross-sectional view of an imaging lens assembly 100a according to the 1st example of the present disclosure. The imaging lens assembly 100a is a specific example of the imaging lens assembly 100 according to the 1st embodiment of the present disclosure. FIG. 2I is a schematic view showing light paths of the imaging lens assembly 100a in FIG. 2H. FIG. 2J is an exploded view of the imaging lens assembly 100a in FIG. 2H. FIG. 2K is another exploded view of the imaging lens assembly 100a in FIG. 2J. In FIG. 2H to FIG. 2J, the imaging lens assembly 100a includes the plastic barrel 110 and a lens set (its reference numeral is omitted), and the lens set is disposed in the plastic barrel 110. The lens set has an optical axis O and includes, from an object side thereof to an image side thereof, a plastic lens element 151, a plastic lens element 152, the plastic lens element 120, a spacer 191, a plastic lens element 153, the spacer 130, a plastic lens element 154, a fixing ring 192 and an image surface 155 (shown in FIG. 2H and FIG. 2I). Details of the plastic barrel 110, the plastic lens element 120 and the spacer 130 have been mentioned above, and are not repeated herein. A light-absorbing coating 151a is disposed on an outer diameter surface of the plastic lens element 151, and a light-absorbing coating 152a is disposed on an outer diameter surface of the plastic lens element 152.

Figure 1A:
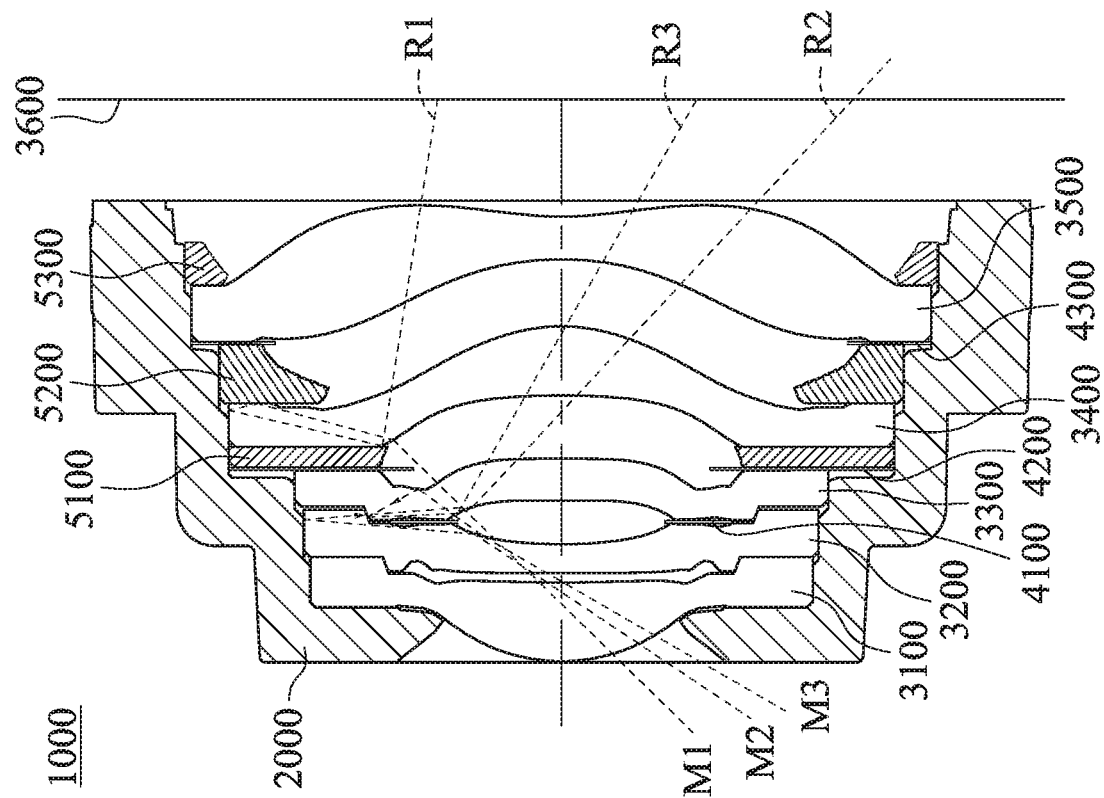
FIG. 1A is a cross-sectional view of a conventional imaging lens assembly.

As shown in FIG. 2I, with the structural coordination between the plastic barrel 110 and the spacer 130, the light trap structure which is favorable for eliminating the stray lights can be formed. Moreover, with the light-absorbing coating 121 (shown in FIG. 2C), the stray lights can be further eliminated. Furthermore, with the structure of the plastic barrel 110, it is favorable for reducing the outer diameter of the plastic lens elements (i.e., the plastic lens element 151, the plastic lens element 152 and the plastic lens element 120) in the first accommodating space 117 (shown in FIG. 2D), so that the surface reflections of the engaging structures of the plastic lens elements in the first accommodating space 117 can be simplified. Accordingly, it is favorable for analyzing the light paths, i.e., more light paths can be deduced in a same time. As a result, it is favorable for controlling or eliminating the stray lights of the imaging lens assembly 100a, and the image quality can be improved. A control experiment is conducted. In an imaging lens assembly of the control experiment, the plastic lens element 151 is replaced by a plastic lens element without the light-absorbing coating 151a on an outer diameter surface thereof, and other details are the same as that of the imaging lens assembly 100a. According to the test results, the image quality of the imaging lens assembly 100a is only slightly better than that of the imaging lens assembly of the control experiment, which shows the light-absorbing coating 151a on the outer diameter surface of the plastic lens element 151 does not need priority attention, and that's why the light path similar to the light path of the incident light M2 shown in FIG. 1A is not drawn in FIG. 2J.

The values of d, w1, w2, $\phi$B1i, $\phi$B2o, $\phi$N1o, $\phi$N1i, $\phi$N2o, w2/w1, $\phi$B2o/$\phi$B1i, $\phi$N2o/$\phi$N1i and $\phi$N1i/$\phi$N1o of the imaging lens assembly 100a are listed in Table 1. Definitions of the aforementioned parameters have been mentioned above, and are not repeated herein.

TABLE 1

| d (mm) | 0.42 | $\Phi$N1i (mm) | 2.9 |
| w1 (mm) | 0.21 | $\Phi$N2o (mm) | 5.3 |
| w2 (mm) | 0.77 | w2/w1 | 3.67 |
| $\Phi$B1i (mm) | 3.2 | $\Phi$Bo/$\Phi$B1i | 1.66 |
| $\Phi$B2o (mm) | 5.3 | $\Phi$N2o/$\Phi$N1i | 1.83 |
| $\Phi$N1o (mm) | 2.55 | $\Phi$N1i/$\Phi$N1o | 1.14 |

2nd Embodiment

Figure 3A:
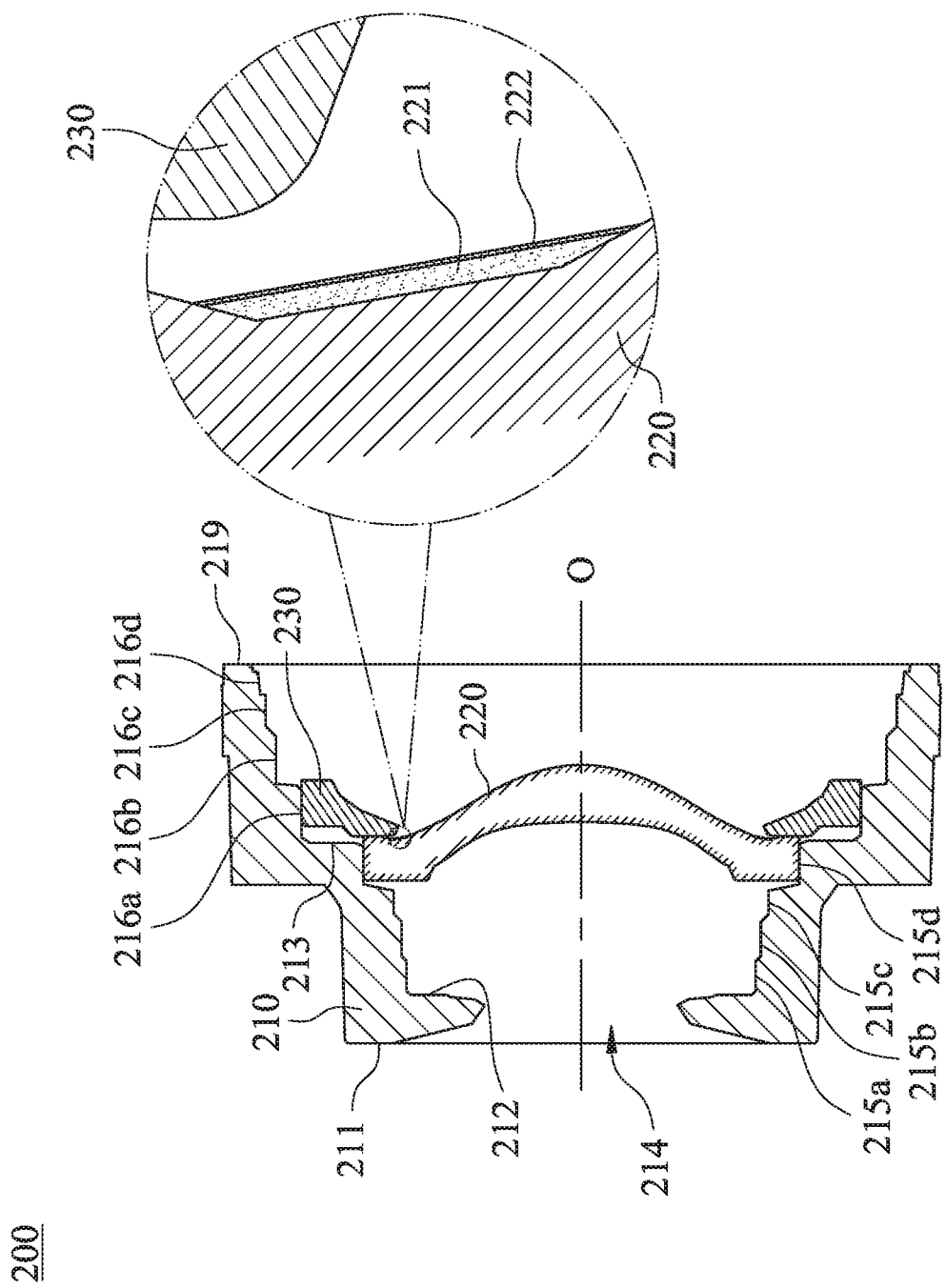
FIG. 3A is a cross-sectional view of an imaging lens assembly according to the 2nd embodiment of the present disclosure in a combined state.
Figure 3B:
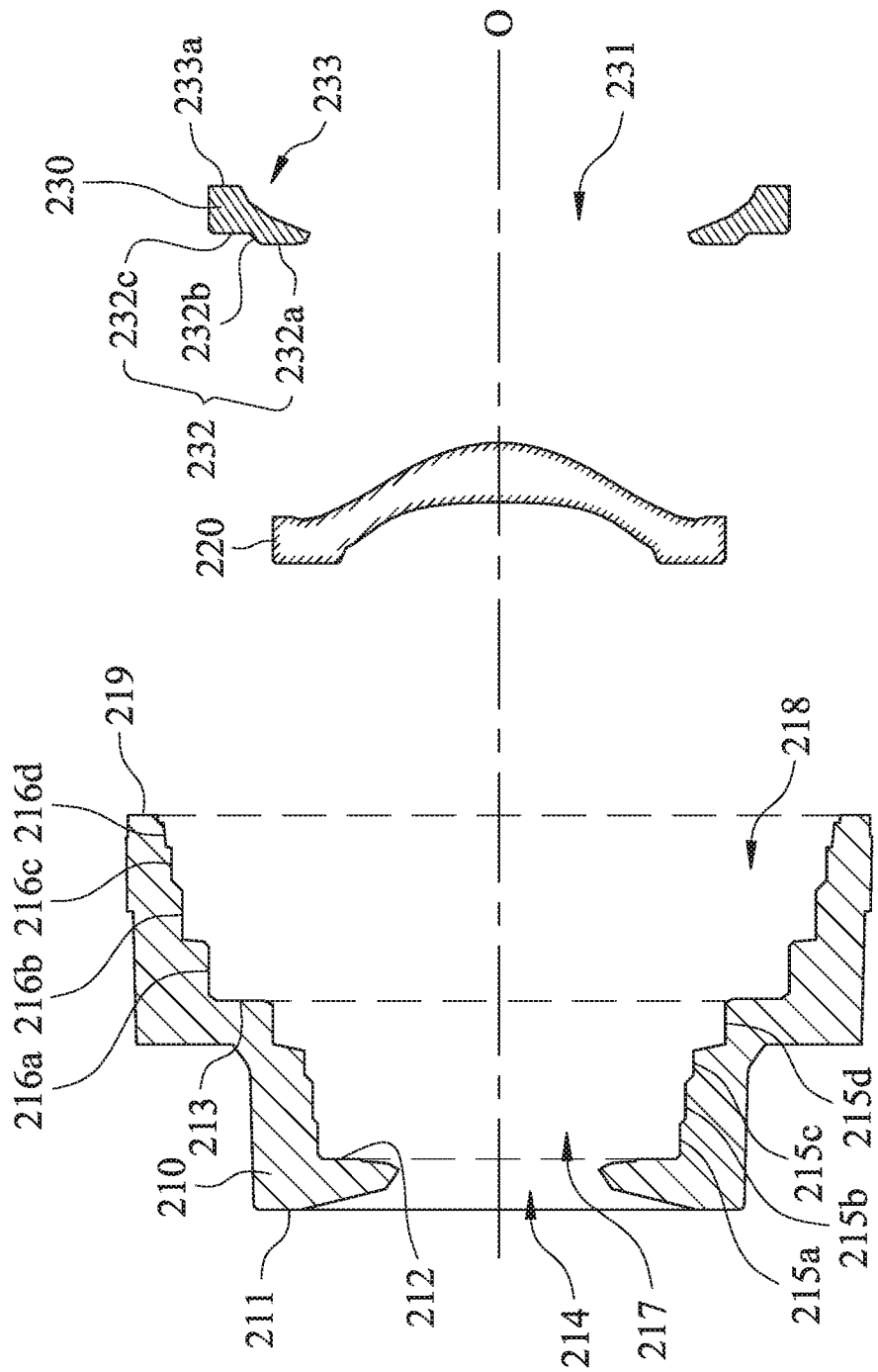
FIG. 3B is a cross-sectional view of the imaging lens assembly in FIG. 3A in a separated state.

FIG. 3A is a cross-sectional view of an imaging lens assembly 200 according to the 2nd embodiment of the present disclosure in a combined state. FIG. 3B is a cross-sectional view of the imaging lens assembly 200 in FIG. 3A in a separated state. In FIG. 3A and FIG. 3B, the imaging lens assembly 200 includes a plastic barrel 210 and a lens set (its reference numeral is omitted), and the lens set is disposed in the plastic barrel 210. The lens set has an optical axis O and includes, from an object side thereof to an image side thereof, at least one plastic lens element 220 and a spacer 230.

The plastic barrel 210 includes an object-side outer surface 211, an object-side opening 214, a first inner surface 212 and a second inner surface 213. The object-side outer surface 211 is a surface of the plastic barrel 210 closest to an object side of the plastic barrel 210. The first inner surface 212 is formed in the plastic barrel 210 and is opposite to the object-side outer surface 211. The first inner surface 212 surrounds an object-side opening 214. The second inner surface 213 is formed in the plastic barrel 210 and is located at an image side of the first inner surface 212. The second inner surface 213 and the first inner surface 212 are substantially parallel to each other.

A light-absorbing coating 221 is disposed on the plastic lens element 220. Specifically, the light-absorbing coating 221 is partially disposed on an image-side surface (its reference numeral is omitted) of the plastic lens element 220.

The spacer 230 includes a central hole 231, an object-side surface 232 and an image-side surface 233. The central hole 231 is coaxial with the object-side opening 214. The object-side surface 232 surrounds the central hole 231. The object-side surface 232 includes an object-side connecting surface 232a and a relative surface 232c. The object-side connecting surface 232a is closer to the central hole 231 than the relative surface 232c, and the object-side connecting surface 232a and the relative surface 232c are substantially parallel to each other. The object-side connecting surface 232a is configured for connecting with a neighboring object-side optical element (not shown). When the object-side connecting surface 232a is connected with the neighboring object-side optical element, the relative surface 232c is out of touch with the neighboring object-side optical element. The image-side surface 233 is opposite to the object-side surface 232, wherein the image-side surface 233 includes an image-side connecting surface 233a. The image-side connecting surface 233a is opposite to the relative surface 232c, and the image-side connecting surface 233a is configured for connecting with a neighboring image-side optical element (not shown). There is an overlap between the second inner surface 213 and the relative surface 232c along a direction parallel to the optical axis O. The light-absorbing coating 221 is closer to the optical axis O than the object-side connecting surface 232a. Therefore, the light trap structure for eliminating stray lights can be formed. Accordingly, the image quality of the imaging lens assembly 200 can be enhanced.

Other technical features of the imaging lens assembly 200 are specified in detail hereinafter. With the following technical features, the ability for eliminating stray lights and other property of the imaging lens assembly 200 can be improved.

The plastic barrel 210 further includes a plurality of inner side surfaces, which are an inner side surface 215a, an inner side surface 215b, an inner side surface 215c, an inner side surface 215d, an inner side surface 216a, an inner side surface 216b, an inner side surface 216c and an inner side surface 216d, respectively. As shown in FIG. 3A and FIG. 3B, each of the inner side surfaces (215a-215d, 216a-216d) is coaxial with the object-side opening 214 and is parallel to the optical axis O, and each of the inner side surfaces is connected with the first inner surface 212, the second inner surface 213 or another inner side surface. A first accommodating space 217 is defined by the first inner surface 212 and the inner side surfaces (215a-215d) located at an object side of the second inner surface 213. A second accommodating space 218 is defined by the second inner surface 213 and the inner side surfaces (216a-216d) located at an image side of the second inner surface 213. The first accommodating space 217 is configured for accommodating plastic lens elements with small outer diameter, such as the plastic lens element 220. The second accommodating space 218 is configured for accommodating plastic lens elements with large outer diameter (which can refer to FIG. 3C). The second inner surface 213 can be out of touch with the lens set (which can refer to FIG. 3C). There is no overlap between a portion of the second inner surface 213 away from the optical axis O and the object-side outer surface 211 along the direction parallel to the optical axis O. The object-side opening 214 of the plastic barrel 210 can be configured to be an aperture of the lens set. An end 219 of the plastic barrel 210 closest to an image side of the plastic barrel 210 can be a quadrangular structure.

The plastic lens element 220 can further include a silicon dioxide coating 222. The silicon dioxide coating 222 is disposed on the light-absorbing coating 221.

The object-side surface 232 of the spacer 230 can further include a conical surface 232b disposed between the object-side connecting surface 232a and the relative surface 232c, and the conical surface 232b is tapered to along a direction from an image side of the spacer 230 to an object side of the spacer 230. When the object-side connecting surface 232a is connected with the neighboring object-side optical element, the conical surface 232b can be out of touch with the neighboring object-side optical element (which can refer to FIG. 3C).

Other details of the imaging lens assembly 200 according to the 2nd embodiment can be the same as that of the imaging lens assembly 100 according to the 1st embodiment, and are not repeated herein.

FIG. 3C is a cross-sectional view of an imaging lens assembly 200a according to the 2nd example of the present disclosure. The imaging lens assembly 200a is a specific example of the imaging lens assembly 200 according to the 2nd embodiment of the present disclosure. FIG. 3D is a schematic view showing light paths of the imaging lens assembly 200a in FIG. 3C. In FIG. 3C and FIG. 3D, the imaging lens assembly 200a includes the plastic barrel 210 and a lens set (its reference numeral is omitted), and the lens set is disposed in the plastic barrel 210. The lens set has an optical axis O and includes, from an object side thereof to an image side thereof, a plastic lens element 251, a plastic lens element 252, a light blocking sheet 271, a plastic lens element 253, a light blocking sheet 272, the plastic lens element 220, the spacer 230, a light blocking sheet 273, a plastic lens element 254, a fixing ring 291 and an image surface 255. Details of the plastic barrel 210, the plastic lens element 220 and the spacer 230 have been mentioned above, and are not repeated herein. A light-absorbing coating 251a is disposed on an outer diameter surface of the plastic lens element 251, a light-absorbing coating 252a is disposed on an outer diameter surface of the plastic lens element 252, and a light-absorbing coating 253a is disposed on an image-side surface (its reference numeral is omitted) of the plastic lens element 253.

As shown in FIG. 3D, with the structural coordination between the plastic barrel 210 and the spacer 230, the light trap structure which is favorable for eliminating the stray lights can be formed. Moreover, with the light-absorbing coating 221, it is favorable for eliminating the stray lights. Accordingly, the stray lights can be prevented from projecting on the image surface 255 to affect the image quality. Furthermore, with the structure of the plastic barrel 210, it is favorable for reducing the outer diameter of the plastic lens elements (i.e., the plastic lens element 251, the plastic lens element 252 and the plastic lens element 220) in the first accommodating space 217 (shown in FIG. 3B), so that the surface reflections of the engaging structures of the plastic lens elements in the first accommodating space 217 can be simplified. Accordingly, it is favorable for analyzing the light paths, i.e., more light paths can be deduced in a same time. As a result, it is favorable for controlling or eliminating the stray lights of the imaging lens assembly 200a, and the image quality can be improved. A control experiment is conducted. In an imaging lens assembly of the control experiment, the plastic lens element 251 is replaced by a plastic lens element without the light-absorbing coating 251a, the plastic lens element 252 is replaced by a plastic lens element without the light-absorbing coating 252a, the plastic lens element 253 is replaced by a plastic lens element without the light-absorbing coating 253a, and other details are the same as that of the imaging lens assembly 200a. Another control experiment is conducted. In an imaging lens assembly of the another control experiment, the plastic lens element 220 is replaced by a plastic lens element without the light-absorbing to coating 221, and other details are the same as that of the imaging lens assembly 200a. According to the test results, when there are no light-absorbing coatings 251a, 252a and 253a respectively disposed on the plastic lens elements 251, 252 and 253, the influence of stray lights is smaller than no light-absorbing coatings 221 disposed on the plastic lens element 220. That is, the light-absorbing coatings 251a, 252a and 253a respectively disposed on the plastic lens elements 251, 252 and 253 do not need priority attention, and that's why only the three light paths relevant to the plastic lens element 220 are shown in FIG. 3D.

The values of d, w1, w2, $\phi$B1i, $\phi$B2o, $\phi$N1o, $\phi$N1i, $\phi$N2o, w2/w1, $\phi$B2o/$\phi$B1i, $\phi$N2o/$\phi$N1i and $\phi$N1i/$\phi$N1o of the imaging lens assembly 200a are listed in Table 2. Definitions of the aforementioned parameters have been mentioned above, and are not repeated herein.

TABLE 2

| d (mm) | 0.45 | $\phi$N1i (mm) | 4.25 |
|---|---|---|---|
| w1 (mm) | 0.34 | $\phi$N2o (mm) | 5.95 |
| w2 (mm) | 0.45 | w2/w1 | 1.32 |
| $\phi$B1i (mm) | 4.25 | $\phi$B2o/$\phi$B1i | 1.28 |
| $\phi$B2o (mm) | 5.45 | $\phi$N2o/$\phi$N1i | 1.40 |
| $\phi$N1o (mm) | 3.4 | $\phi$N1i/$\phi$N1o | 1.25 |

3rd Embodiment

Figure 4A:
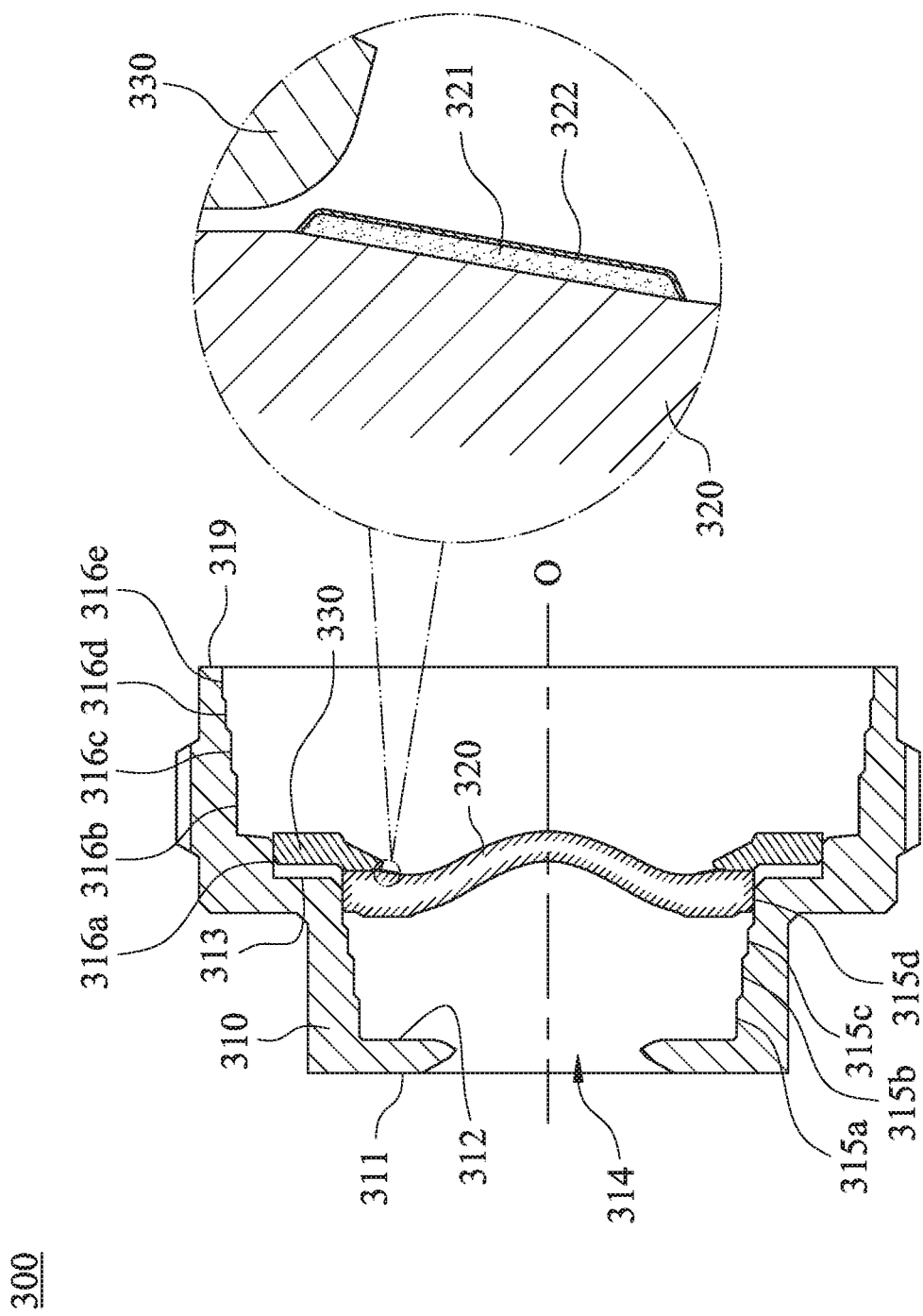
FIG. 4A is a cross-sectional view of an imaging lens assembly according to the 3rd embodiment of the present disclosure in a combined state.
Figure 4B:
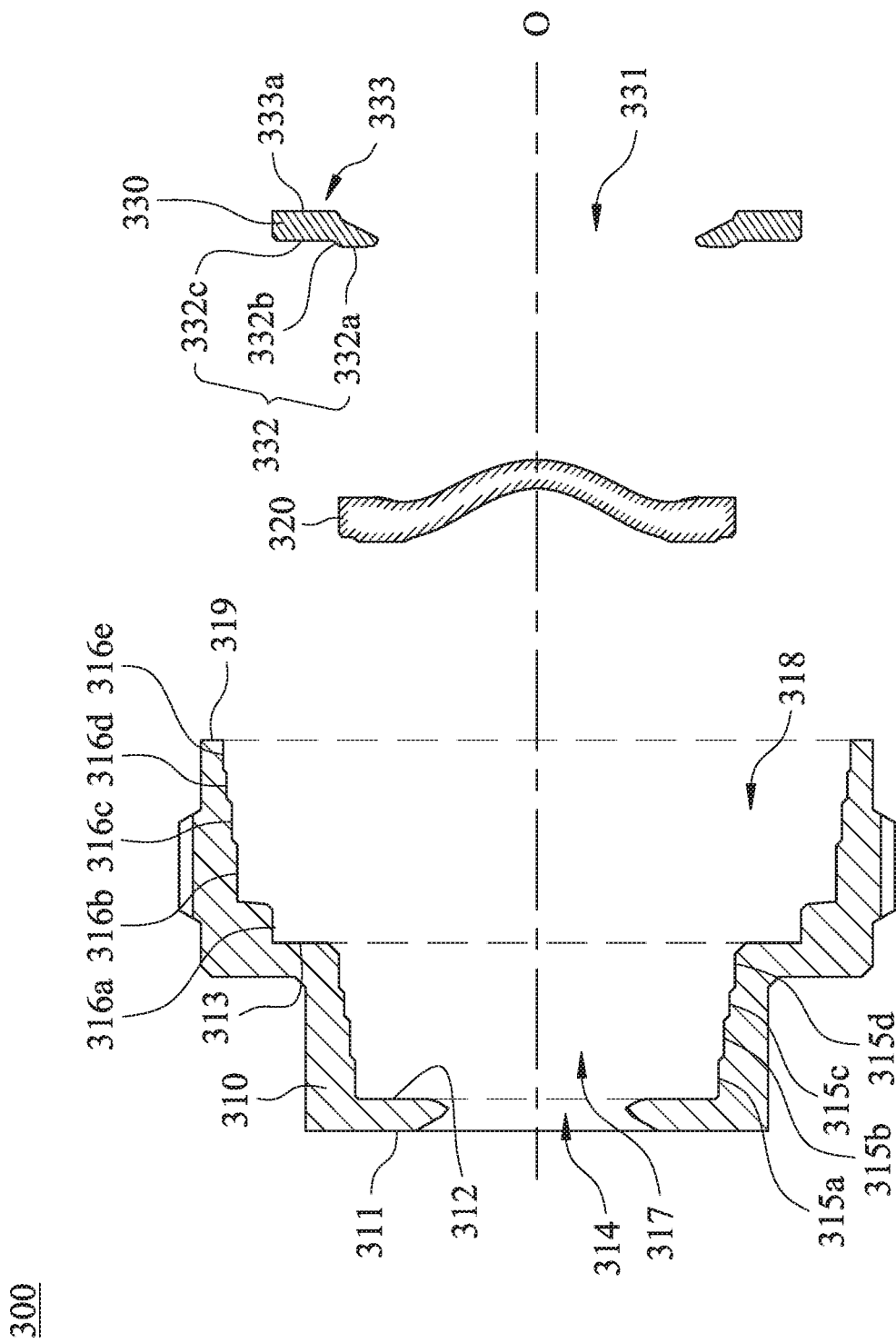
FIG. 4B is a cross-sectional view of the imaging lens assembly in FIG. 4A in a separated state.

FIG. 4A is a cross-sectional view of an imaging lens assembly 300 according to the 3rd embodiment of the present disclosure in a combined state. FIG. 4B is a cross-sectional view of the imaging lens assembly 300 in FIG. 4A in a separated state. In FIG. 4A and FIG. 4B, the imaging lens assembly 300 includes a plastic barrel 310 and a lens set (its reference numeral is omitted), and the lens set is disposed in the plastic barrel 310. The lens set has an optical axis O and includes, from an object side thereof to an image side thereof, at least one plastic lens element 320 and a spacer 330.

The plastic barrel 310 includes an object-side outer surface 311, an object-side opening 314, a first inner surface 312 and a second inner surface 313. The object-side outer surface 311 is a surface of the plastic barrel 310 closest to an object side of the plastic barrel 310. The first inner surface 312 is formed in the plastic barrel 310 and is opposite to the object-side outer surface 311. The first inner surface 312 surrounds an object-side opening 314. The second inner surface 313 is formed in the plastic barrel 310 and is located at an image side of the first inner surface 312. The second inner surface 313 and the first inner surface 312 are substantially parallel to each other.

A light-absorbing coating 321 is disposed on the plastic lens element 320. Specifically, the light-absorbing coating 321 is partially disposed on an image-side surface (its reference numeral is omitted) of the plastic lens element 320.

The spacer 330 includes a central hole 331, an object-side surface 332 and an image-side surface 333. The central hole 331 is coaxial with the object-side opening 314. The object-side surface 332 surrounds the central hole 331. The object-side surface 332 includes an object-side connecting surface 332a and a relative surface 332c. The object-side connecting surface 332a is closer to the central hole 331 than the relative surface 332c, and the object-side connecting surface 332a and the relative surface 332c are substantially parallel to each other. The object-side connecting surface 332a is configured for connecting with a neighboring object-side optical element (not shown). When the object-side connecting surface 332a is connected with the neighboring object-side optical element, the relative surface 332c is out of touch with the neighboring object-side optical element. The image-side surface 333 is opposite to the object-side surface 332, wherein the image-side surface 333 includes an image-side connecting surface 333a. The image-side connecting surface 333a is opposite to the relative surface 332c, and the image-side connecting surface 333a is configured for connecting with a neighboring image-side optical element (not shown). There is an overlap between the second inner surface 313 and the relative surface 332c along a direction parallel to the optical axis O. The light-absorbing coating 321 is closer to the optical axis O than the object-side connecting surface 332a. Therefore, the light trap structure for eliminating stray lights can be formed. Accordingly, the image quality of the imaging lens assembly 300 can be enhanced.

Other technical features of the imaging lens assembly 300 are specified in detail hereinafter. With the following technical features, the ability for eliminating stray lights and other property of the imaging lens assembly 300 can be improved.

The plastic barrel 310 can further include a plurality of inner side surfaces, which are an inner side surface 315a, an inner side surface 315b, an inner side surface 315c, an inner side surface 315d, an inner side surface 316a, an inner side surface 316b, an inner side surface 316c, an inner side surface 316d and an inner side surface 316e, respectively. As shown in FIG. 4A and FIG. 4B, each of the inner side surfaces (315a-315d, 316a-316e) is coaxial with the object-side opening 314 and is parallel to the optical axis O, and each of the inner side surfaces is connected with the first inner surface 312, the second inner surface 313 or another inner side surface. A first accommodating space 317 is defined by the first inner surface 312 and the inner side surfaces (315a-315d) located at an object side of the second inner surface 313. A second accommodating space 318 is defined by the second inner surface 313 and the inner side surfaces (316a-316e) located at an image side of the second inner surface 313. The first accommodating space 317 is configured for accommodating plastic lens elements with small outer diameter, such as the plastic lens element 320. The second accommodating space 318 is configured for accommodating plastic lens elements with large outer diameter (which can refer to FIG. 4C). The second inner surface 313 can be out of touch with the lens set (which can refer to FIG. 4C). There is no overlap between a portion of the second inner surface 313 away from the optical axis O and the object-side outer surface 311 along the direction parallel to the optical axis O. The object-side opening 314 can be configured to be an aperture of the lens set. An end 319 of the plastic barrel 310 closest to an image side of the plastic barrel 310 can be a quadrangular structure.

The plastic lens element 320 can further include a silicon dioxide coating 322. The silicon dioxide coating 322 is disposed on the light-absorbing coating 321.

The object-side surface 332 of the spacer 330 can further include a conical surface 332b disposed between the object-side connecting surface 332a and the relative surface 332c, and the conical surface 332b is tapered along a direction from an image side of the spacer 330 to an object side of the spacer 330. When the object-side connecting surface 332a is connected with the neighboring object-side optical element, the conical surface 332b can be out of touch with the neighboring object-side optical element (which can refer to FIG. 4C).

Other details of the imaging lens assembly 300 according to the 3rd embodiment can be the same as that of the imaging lens assembly 100 according to the 1st embodiment, and are not repeated herein.

Figure 4C:
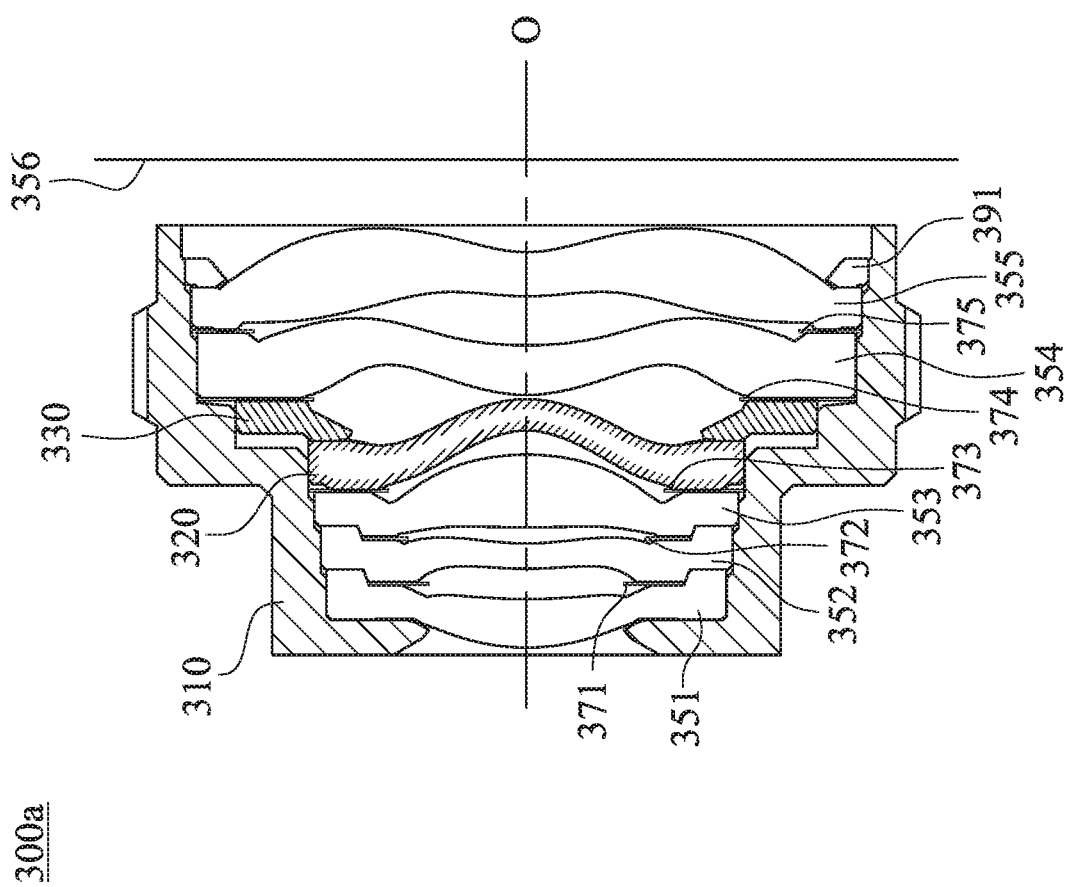
FIG. 4C is a cross-sectional view of an imaging lens assembly according to the 3rd example of the present disclosure.

FIG. 4C is a cross-sectional view of an imaging lens assembly 300a according to the 3rd example of the present disclosure. The imaging lens assembly 300a is a specific example of the imaging lens assembly 300 according to the 3rd embodiment of the present disclosure. In FIG. 4C, the imaging lens assembly 300a includes the plastic barrel 310 and a lens set (its reference numeral is omitted), and the lens set is disposed in the plastic barrel 310. The lens set has an optical axis O and includes, from an object side thereof to an image side thereof, a plastic lens element 351, a light blocking sheet 371, a plastic lens element 352, a light blocking sheet 372, a plastic lens element 353, a light blocking sheet 373, the plastic lens element 320, the spacer 330, a light blocking sheet 374, a plastic lens element 354, a light blocking sheet 375, a plastic lens element 355, a fixing ring 391 and an image surface 356. Details of the plastic barrel 310, the plastic lens element 320 and the spacer 330 have been mentioned above, and are not repeated herein.

As shown in FIG. 4C, with the structural coordination between the plastic barrel 310 and the spacer 330, the light trap structure favorable for eliminating the stray lights can be formed. Moreover, with the light-absorbing coating 321, it is favorable for eliminating the stray lights. Accordingly, the stray lights can be prevented from projecting on the image surface 356 to affect the image quality. Furthermore, with the structure of the plastic barrel 310, it is favorable for reducing the outer diameter of the plastic lens elements (i.e., the plastic lens element 351, the plastic lens element 352, the plastic lens element 353 and the plastic lens element 320) in the first accommodating space 317, so that the surface reflections of the engaging structures of the plastic lens elements in the first accommodating space 317 can be simplified. Accordingly, it is favorable for analyzing the light paths, i.e., more light paths can be deduced in a same time. As a result, it is favorable for controlling or eliminating the stray lights of the imaging lens assembly 300a, and the image quality can be improved.

The values of d, w1, w2, φB1i, φB2o, φN1o, φN1i, φN2o, w2/w1, φB2o/φB1i, φN2o/φN1i and φN1i/φN1o of the imaging lens assembly 300a are listed in Table 3. Definitions of the aforementioned parameters have been mentioned above, and are not repeated herein.

TABLE 3

| | | | |
|---|---|---|---|
| d (mm) | 0.27 | φN1i (mm) | 3.6 |
| w1 (mm) | 0.63 | φN2o (mm) | 5.44 |
| w2 (mm) | 0.5 | w2/w1 | 0.79 |
| φB1i (mm) | 3.6 | φB2o/φB1i | 1.33 |
| φB2o (mm) | 4.8 | φN2o/φN1i | 1.51 |
| φN1o (mm) | 3.3 | φN1i/φN1o | 1.09 |

Camera Module

According to the present disclosure, a camera module is provided. The camera module includes the aforementioned imaging lens assembly and an image sensor. The image sensor is disposed on an image surface of the imaging lens assembly. Therefore, it is favorable for eliminating stray lights and enhancing the image quality of the camera module. Details of the imaging lens assembly have been mentioned above, and are not repeated herein.

FIG. 5 is a schematic view of a camera module 10 according to the 4th example of the present disclosure. The camera module 10 includes the imaging lens assembly 100a, an auto focus component 11, an optical anti-shake component 12, an image sensor 13, a flexible printed circuit board (FPC) 14 and a connector 15. Details of the imaging lens assembly 100a can refer to FIG. 2H to FIG. 2K. In the camera module 10, lights are focused by the imaging lens assembly 100a for generating an image, the auto focus component 11 and the optical anti-shake component 12 are used to assist the imaging lens assembly 100a into focus, then the image is formed on the image sensor 13, and the data of the image is outputted by the flexible printed circuit board 14 and the connector 15.

Electronic Device

According to the present disclosure, an electronic device is provided. The electronic device includes the aforementioned camera module. Therefore, it is favorable for eliminating stray lights and the electronic device can satisfy the demand for high image quality. Details of the imaging lens assembly have been mentioned above, and are not repeated herein. The electronic device can further include but not limited to a display, a control unit, a storage unit, a random access memory unit (RAM), a read only memory unit (ROM) or a combination thereof. Moreover, the electronic device can be applied to but is not limited to a 3D (three-dimensional) image capturing applications, in products such as digital cameras, mobile devices, digital tablets, smart TV, surveillance devices, game consoles with motion sensing function, vehicle cameras such as driving recording systems and rear view camera systems, aerial photography devices, sports photography equipment, all kinds of smart electronics and wearable devices.

Figure 6A:
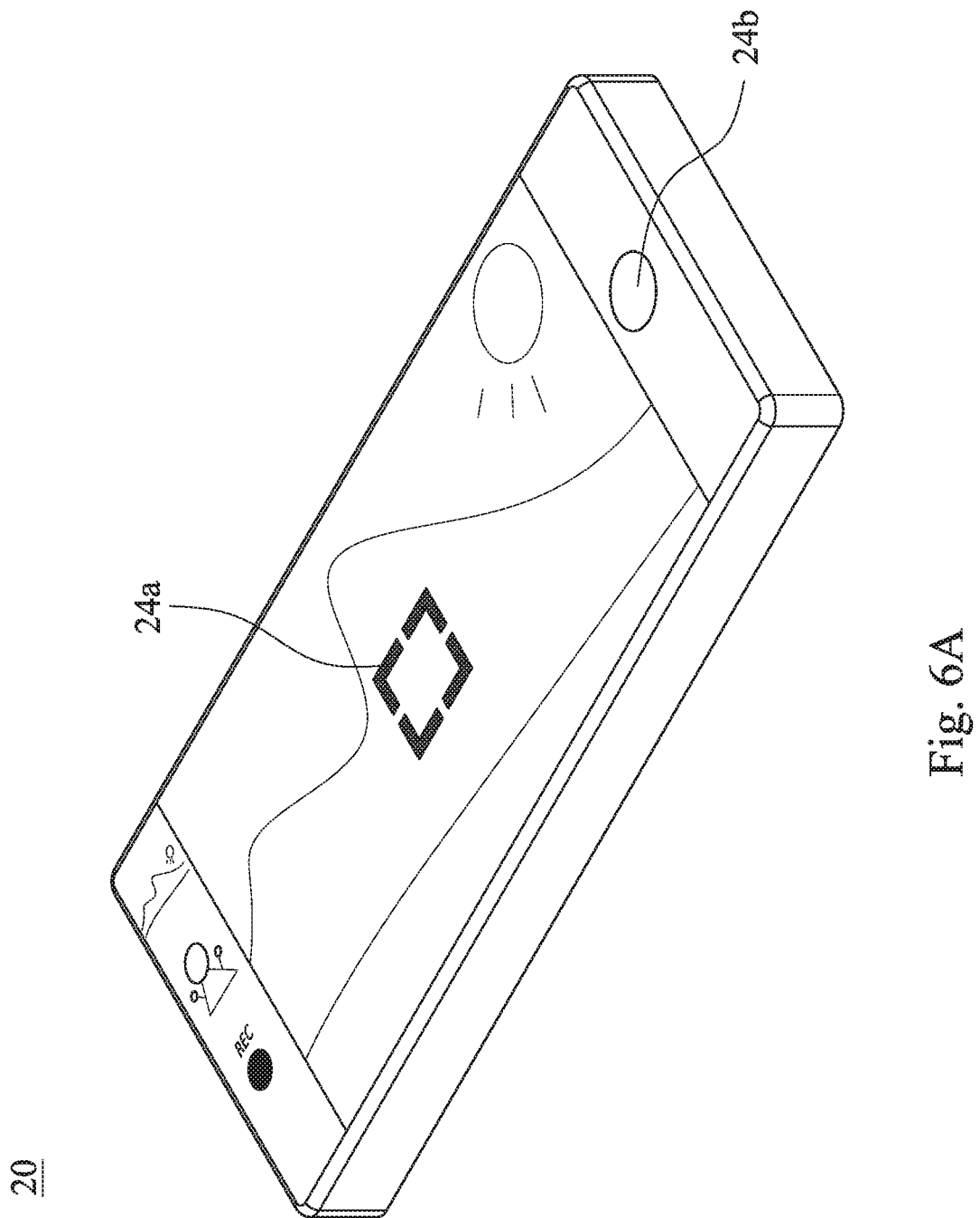
FIG. 6A is a schematic view showing a side of an electronic device according to the 5th example of the present disclosure.
Figure 6B:
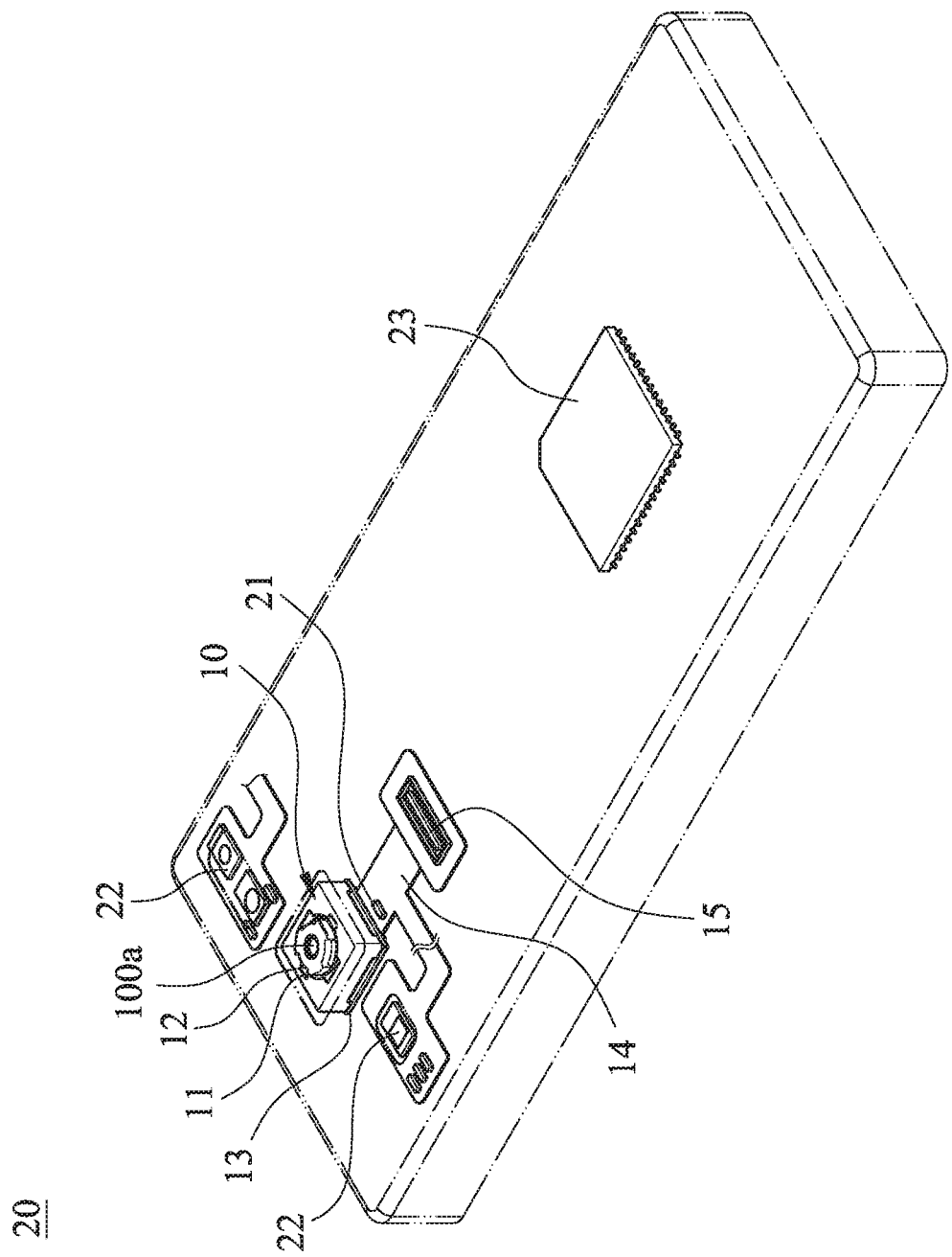
FIG. 6B is a schematic view showing another side of the electronic device in FIG. 6A.

Refer to FIG. 6A and FIG. 6B. FIG. 6A is a schematic view showing a side of an electronic device 20 according to the 5th example of the present disclosure. FIG. 6B is a schematic view showing another side of the electronic device 20 in FIG. 6A. In FIG. 6A and FIG. 6B, the electronic device 20 of the 5th embodiment is a smart phone, and the electronic device 20 includes the camera module 10 of the present disclosure.

Specifically, the user activates the capturing mode via the user interface 24 of the electronic device 20, wherein the user interface 24 of the 5th embodiment can be a touch screen 24a, a button 24b, etc. At this moment, the imaging lens assembly 100a collects imaging lights on the image sensor 13 and outputs electronic signals associated with images to an image signal processor (ISP) 23.

Figure 6C:
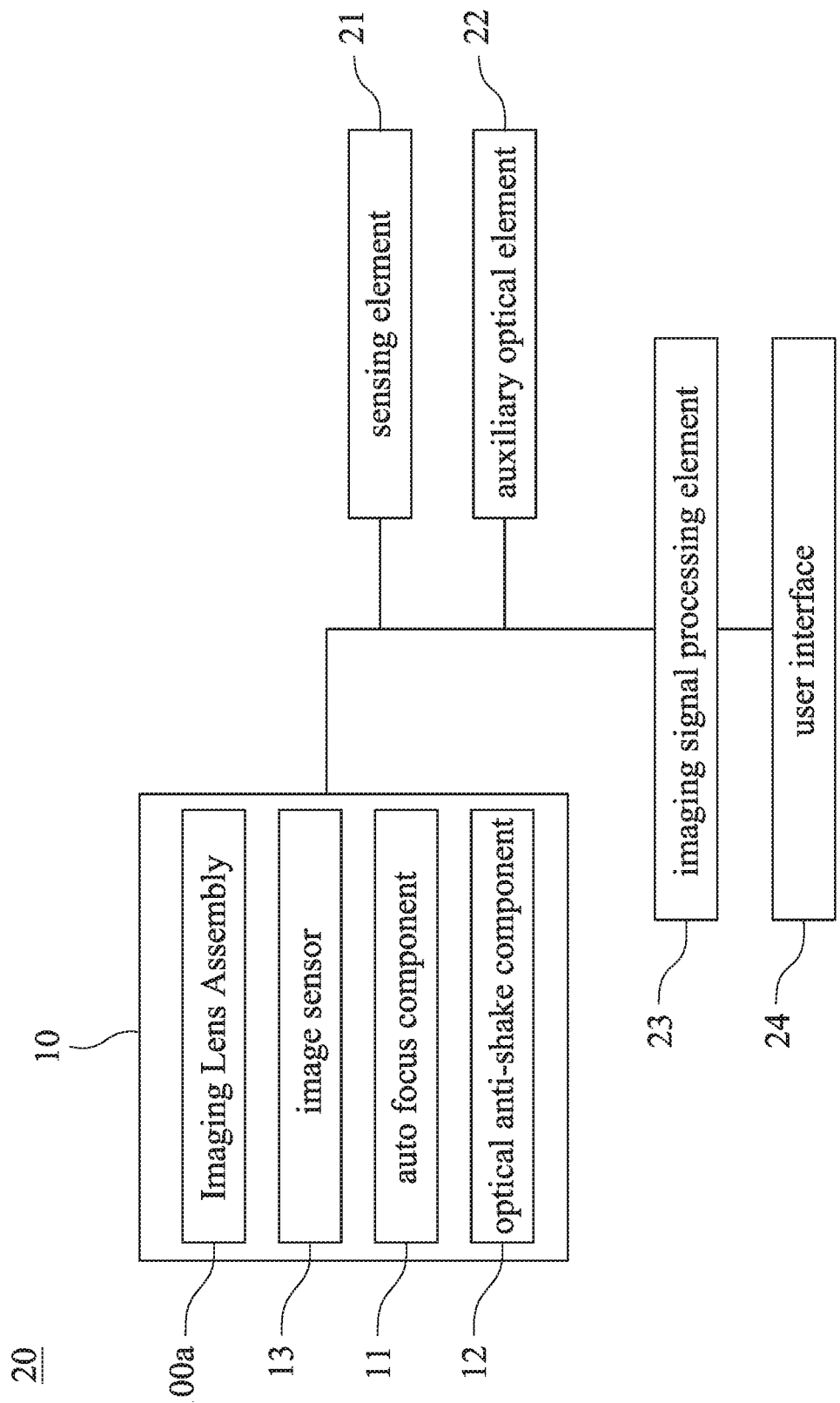
FIG. 6C is a block diagram of the electronic device in FIG. 6A.

FIG. 6C is a block diagram of the electronic device 20 in FIG. 6A. In FIG. 6A to FIG. 6C, the electronic device 20 can further include at least one ne auxiliary optical element 22 and at least one sensing element 21 in response to the specification of the camera module 10 of the electronic device 20. The auxiliary optical element 22 can be flash modules for compensating color temperatures, infrared distance measurement components, laser focus modules, etc. The sensing element 21 can have functions for sensing physical momentum and kinetic energies, such as an accelerator, a gyroscope, and a hall effect element, to sense shaking or jitters applied by hands of the user or to external environments. As a result, the auto focus component 11 and the optical anti-shake component 12 disposed on the camera module 10 can function to obtain great imaging qualities and facilitate the electronic device 20 according to the present disclosure to have a capturing function with multiple modes, such as taking optimized selfies, high dynamic range (HDR) with a low light source, 4K resolution recording, etc. Additionally, the user can visually see the captured image of the camera module 10 through the touch screen 24a and manually operate the view finding range on the touch screen 24a to achieve the auto focus function of what you see is what you get.

Furthermore, in FIG. 6B, the imaging lens assembly 100a, the image sensor 13, the auto focus component 11, the optical anti-shake component 12, the sensing elements 21, and the auxiliary optical element 22 can be disposed on a flexible printed circuit board 14 and electrically connected with the associated elements, such as an imaging signal processing element 23, via a connector 15 to perform a capturing process. Since the current electronic devices, such as smart phones, have a tendency of being light and thin, the way of firstly disposing the imaging lens assembly 100a and related elements on the flexible printed circuit board and secondly integrating the circuit into the main board of the electronic device via the connector can satisfy the mechanical design of the limited space inside the electronic device and the layout requirements and obtain more margins. The auto focus function of the camera module can be controlled more flexibly via the touch screen of the electronic device. In the 5th embodiment, the electronic device 20 includes a plurality of sensing elements 21 and a plurality of auxiliary optical elements 22. The sensing elements 21 and the auxiliary optical elements 22 are disposed on the flexible printed circuit board 14 and at least one other flexible printed circuit board (its reference numeral is omitted) and electrically connected with the associated elements, such as an imaging signal processing element 23, via corresponding connectors (not shown) to perform a capturing process. In other embodiments (not shown), the sensing elements and the auxiliary optical elements can also be disposed on the main board of the electronic device or carrier boards in other forms according to requirements of the mechanical design and the circuit layout.

FIG. 7 is a schematic view of an electronic device 30 according to the 6th example of the present disclosure. In FIG. 7, the electronic device 30 of the 6th embodiment is a tablet, and the electronic device 30 includes the camera module 31 of the present disclosure.

Figure 8:
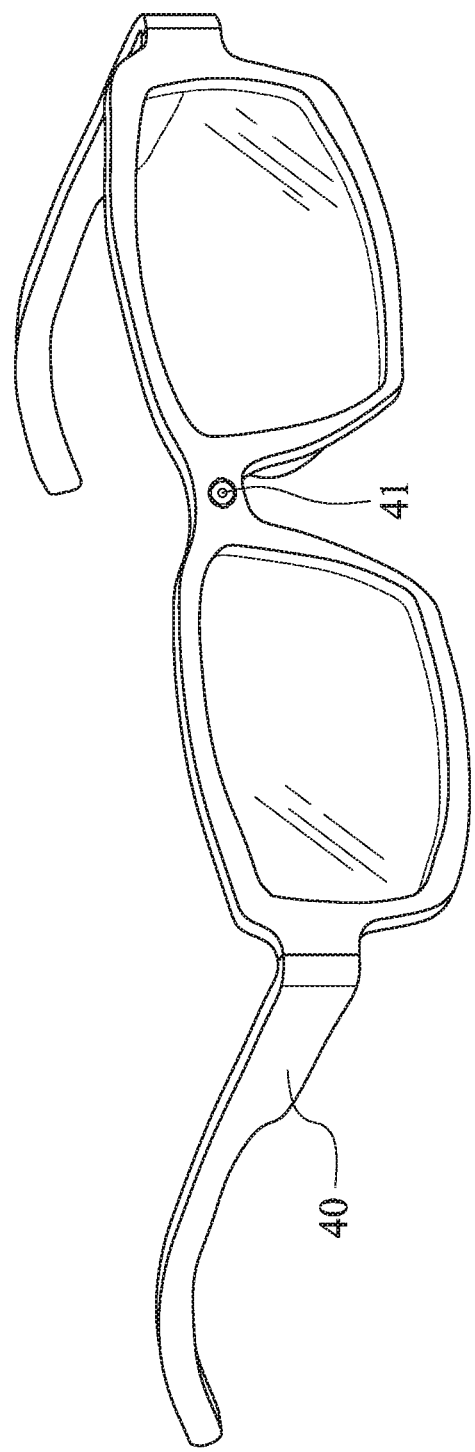
FIG. 8 is a schematic view of an electronic device according to the 7th example of the present disclosure.

FIG. 8 is a schematic view of an electronic device 40 according to the 7th example of the present disclosure. In FIG. 7, the electronic device 40 of the 7th embodiment is a wearable device, and the electronic device 40 includes the camera module 41 of the present disclosure.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An imaging lens assembly, comprising:
a plastic barrel, comprising:
an object-side outer surface;
a first inner surface formed in the plastic barrel and opposite to the object-side outer surface, wherein the first inner surface surrounds an object-side opening; and
a second inner surface formed in the plastic barrel and located at an image side of the first inner surface, wherein there is no overlap between the second inner surface and the first inner surface along a direction parallel to an optical axis; and
a lens set disposed in the plastic barrel, wherein the lens set comprises, from an object side thereof to an image side thereof, at least one plastic lens element and a spacer, a light-absorbing coating is disposed on the plastic lens element, and the spacer comprises:
a central hole coaxial with the object-side opening;
an object-side surface surrounding the central hole, wherein the object-side surface comprises an object-side connecting surface and a relative surface, the object-side connecting surface is closer to the central hole than the relative surface, the object-side connecting surface is configured for connecting with an neighboring object-side optical element, when the object-side connecting surface is connected with the neighboring object-side optical element, the relative surface is out of touch with the neighboring object-side optical element; and
an image-side surface opposite to the object-side surface, wherein the image-side surface comprises an image-side connecting surface, the image-side connecting surface is opposite to the relative surface, and the image-side connecting surface is configured for connecting with an neighboring image-side optical element;
wherein there is an overlap between the second inner surface and the relative surface along the direction parallel to the optical axis, the light-absorbing coating is closer to the optical axis than the object-side connecting surface of the spacer, and there is no overlap between the object-side connecting surface of the spacer and the first inner surface of the plastic barrel along the direction parallel to the optical axis.

2. The imaging lens assembly of claim 1, wherein the second inner surface is out of touch with the lens set.

3. The imaging lens assembly of claim 2, wherein the object-side surface further comprises a conical surface disposed between the object-side connecting surface and the relative surface, and the conical surface is tapered along a direction from an image side of the spacer to an object side of the spacer.

4. The imaging lens assembly of claim 3, wherein when the object-side connecting surface is connected with the neighboring object-side optical element, the conical surface is out of touch with the neighboring object-side optical element.

5. The imaging lens assembly of claim 2, wherein the plastic barrel further comprises a plurality of inner side surfaces, each of the inner side surfaces is coaxial with the object-side opening and is parallel to the optical axis, each of the inner side surfaces is connected with the first inner surface, the second inner surface or another inner side surface, a first accommodating space is defined by the first inner surface and the inner side surface located at an object side of the second inner surface, a second accommodating space is defined by the second inner surface and the inner side surface located at an image side of the second inner surface, a diameter of the inner side surface in the first accommodating space closest to an image side of the plastic barrel is $\phi B1i$, a diameter of the inner side surface in the second accommodating space closest to an object side of the plastic barrel is $\phi B2o$, and the following condition is satisfied:

$$1.27 < \phi B2o/\phi B1i < 2.0.$$

6. The imaging lens assembly of claim 5, wherein the lens set comprises at least two plastic lens elements, an outer diameter of the plastic lens element in the first accommodating space closest to the image side of the plastic barrel is $\phi N1i$, an outer diameter of the plastic lens element in the second accommodating space closest to the object side of the plastic barrel is $\phi N2o$, and the following condition is satisfied:

$$1.35 < \phi N2o/\phi N1i < 2.2.$$

7. The imaging lens assembly of claim 5, wherein the lens set comprises at least two plastic lens elements, an outer diameter of the plastic lens element in the first accommodating space closest to the object side of the plastic barrel is $\phi N1o$, an outer diameter of the plastic lens element in the first accommodating space closest to the image side of the plastic barrel is $\phi N1i$, and the following condition is satisfied:

$$1.0 < \phi N1i/\phi N1o < 1.28.$$

8. The imaging lens assembly of claim 5, wherein the lens set comprises at least two plastic lens elements, an outer diameter of the plastic lens element in the first accommodating space closest to the image side of the plastic barrel is $\phi N1i$, an outer diameter of the plastic lens element in the second accommodating space closest to the object side of the plastic barrel is $\phi N2o$, and the following condition is satisfied:

$$1.50 < \phi N2o/\phi N1i.$$

9. The imaging lens assembly of claim 2, wherein a width of the second inner surface is w2, a width of the first inner surface is w1, and the following condition is satisfied:

$$2.0 < w2/w1 < 6.5.$$

10. The imaging lens assembly of claim 9, wherein the width of the second inner surface is w2, the width of the first inner surface is w1, and the following condition is satisfied:

$$2.0 < w2/w1 < 5.5.$$

11. The imaging lens assembly of claim 2, wherein there is no overlap between a portion of the second inner surface away from the optical axis and the object-side outer surface along the direction parallel to the optical axis.

12. The imaging lens assembly of claim 11, wherein there is no overlap between the second inner surface and the object-side outer surface along the direction parallel to the optical axis.

13. The imaging lens assembly of claim 2, wherein a thickness of the spacer between the relative surface and the image-side connecting surface is d, and the following condition is satisfied:

$$0.15 \text{ mm} < d < 0.75 \text{ mm}.$$

14. The imaging lens assembly of claim 2, wherein the plastic lens element further comprises a silicon dioxide coating disposed on the light-absorbing coating.

15. The imaging lens assembly of claim 1, wherein the object-side opening is configured to be an aperture of the lens set.

16. The imaging lens assembly of claim 1, wherein an end of the plastic barrel closest to an image side of the plastic barrel is a quadrangular structure.

17. A camera module, comprising:
the imaging lens assembly of claim 1; and
an image sensor disposed on an image surface of the imaging lens assembly.

18. The camera module of claim 17, wherein the lens set comprises a plurality of plastic lens elements, a total number of the plastic lens elements of the lens set is N, a number of the plastic lens elements with small outer diameter of the lens set is N1, a number of the plastic lens elements with large outer diameter of the lens set is N2, N1 is a positive integer from 1 to N−1, an outer diameter of each of the plastic lens elements with small outer diameter is $\phi N1m$, m is a positive integer from 1 to N−1, an outer diameter of each of the plastic lens elements with large outer diameter is $\phi N2n$, n is a positive integer from 1 to N2, and the following conditions are satisfied:

$5 \leq N < 10$;

$N = N1 + N2$;

$2.8 \text{ mm} < \phi N1m < 3.8 \text{ mm}$; and $4.7 \text{ mm} < \phi N2n < 7.0 \text{ mm}$.

19. The camera module of claim 18, wherein the number of the plastic lens elements with small outer diameter of the lens set is N1, and the following condition is satisfied:

$3 \leq N1$.

20. The camera module of claim 19, wherein the number of the plastic lens element with small outer diameter of the lens set is N1, and the following condition is satisfied:

$4 \leq N1$.

21. An electronic device, comprising:
the camera module of claim 17.

* * * * *